United States Patent
Song

(10) Patent No.: US 9,232,124 B2
(45) Date of Patent: Jan. 5, 2016

(54) CHANGING AN ORIENTATION OF A DISPLAY OF A DIGITAL PHOTOGRAPHING APPARATUS ACCORDING TO A MOVEMENT OF THE APPARATUS

(75) Inventor: Won-seok Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 13/592,863

(22) Filed: Aug. 23, 2012

(65) Prior Publication Data
US 2013/0128078 A1   May 23, 2013

(30) Foreign Application Priority Data

Nov. 17, 2011   (KR) ......................... 10-2011-0120320

(51) Int. Cl.
*H04N 5/222* (2006.01)
*H04N 5/228* (2006.01)
*H04N 5/262* (2006.01)
*H04N 5/232* (2006.01)
*H04N 5/225* (2006.01)

(52) U.S. Cl.
CPC ............. *H04N 5/232* (2013.01); *H04N 5/2251* (2013.01); *H04N 5/23293* (2013.01); *H04N 5/2621* (2013.01)

(58) Field of Classification Search
CPC .......... H04N 5/23293; H04N 2101/00; H04N 5/2251; H04N 1/32101; H04N 1/32128; H04N 1/3871; H04N 1/3872; H04N 2201/3254; H04N 5/262; G03B 13/02; G03B 17/04
USPC .................... 348/333.01–333.13, 222.1, 239; 345/649–659
See application file for complete search history.

(56) References Cited

U.S. PATENT DOCUMENTS

| | | | |
|---|---|---|---|
| 6,574,353 B1 * | 6/2003 | Schoepflin et al. | 382/103 |
| 6,621,481 B1 * | 9/2003 | Kanbara | 345/100 |
| 7,190,968 B2 * | 3/2007 | Nakamura | 455/550.1 |
| 7,587,524 B2 | 9/2009 | Cho et al. | |
| 8,023,033 B2 * | 9/2011 | Kirihara et al. | 348/341 |
| 8,159,593 B2 * | 4/2012 | Takahashi et al. | 348/333.06 |

(Continued)

FOREIGN PATENT DOCUMENTS

| JP | 11-098485 A | 4/1999 |
|---|---|---|
| KR | 10-2005-0094217 A | 9/2005 |

OTHER PUBLICATIONS

PCT Search Report and Written Opinion established for PCT/KR2012/009631 (Feb. 22, 2013).

*Primary Examiner* — Chia-Wei A Chen
(74) *Attorney, Agent, or Firm* — Drinker Biddle & Reath LLP

(57) ABSTRACT

A digital photographing apparatus includes: an imaging device that generates an image signal by capturing image light; a storage unit that stores a template including a background area and a composite area that indicates at least a part of an image according to the image signal; an image changing unit that changes orientations of the template and the image; an image composing unit that composes the image and the template of which orientations are changed; and a display unit that displays the composed image, wherein the image changing unit determines orientations to be changed of the template and the image according to a rotation amount of the imaging device with respect to an optical axis of the image light and an orientation in which an imaging surface of the imaging device faces. Accordingly, a user may naturally perform a self-photography function using a template.

20 Claims, 20 Drawing Sheets

(56) References Cited

U.S. PATENT DOCUMENTS

| | | | |
|---|---|---|---|
| 8,872,855 B2* | 10/2014 | Doll | 345/649 |
| 2005/0088542 A1* | 4/2005 | Stavely et al. | 348/239 |
| 2005/0122412 A1* | 6/2005 | Shirakawa et al. | 348/239 |
| 2005/0206747 A1* | 9/2005 | Shirakawa | 348/231.6 |
| 2005/0259173 A1* | 11/2005 | Nakajima et al. | 348/333.12 |
| 2006/0215052 A1* | 9/2006 | Nagaoka et al. | 348/333.06 |
| 2007/0002157 A1* | 1/2007 | Shintani et al. | 348/333.06 |
| 2007/0081089 A1* | 4/2007 | Higuchi et al. | 348/333.06 |
| 2007/0281749 A1 | 12/2007 | Suga | |
| 2008/0036876 A1* | 2/2008 | Kaneda et al. | 348/230.1 |
| 2008/0117307 A1* | 5/2008 | Sato | 348/222.1 |
| 2008/0152199 A1* | 6/2008 | Oijer | 382/118 |
| 2009/0015702 A1* | 1/2009 | Garcia Alonso | 348/333.02 |
| 2009/0027494 A1* | 1/2009 | Cavallaro et al. | 348/135 |
| 2009/0040308 A1 | 2/2009 | Temovskiy | |
| 2009/0287990 A1* | 11/2009 | Lynton et al. | 715/209 |
| 2009/0295975 A1* | 12/2009 | Takahashi et al. | 348/333.01 |
| 2009/0310814 A1* | 12/2009 | Gallagher et al. | 382/100 |
| 2010/0214584 A1* | 8/2010 | Takahashi | 358/1.9 |
| 2010/0225771 A1* | 9/2010 | Yumiki | 348/207.2 |
| 2010/0295983 A1* | 11/2010 | Nozawa | 348/333.01 |
| 2011/0149094 A1* | 6/2011 | Chen et al. | 348/208.3 |
| 2012/0081576 A1* | 4/2012 | Seo et al. | 348/231.6 |
| 2012/0113308 A1* | 5/2012 | Ishikawa | 348/333.06 |
| 2013/0342671 A1* | 12/2013 | Hummel et al. | 348/77 |

\* cited by examiner

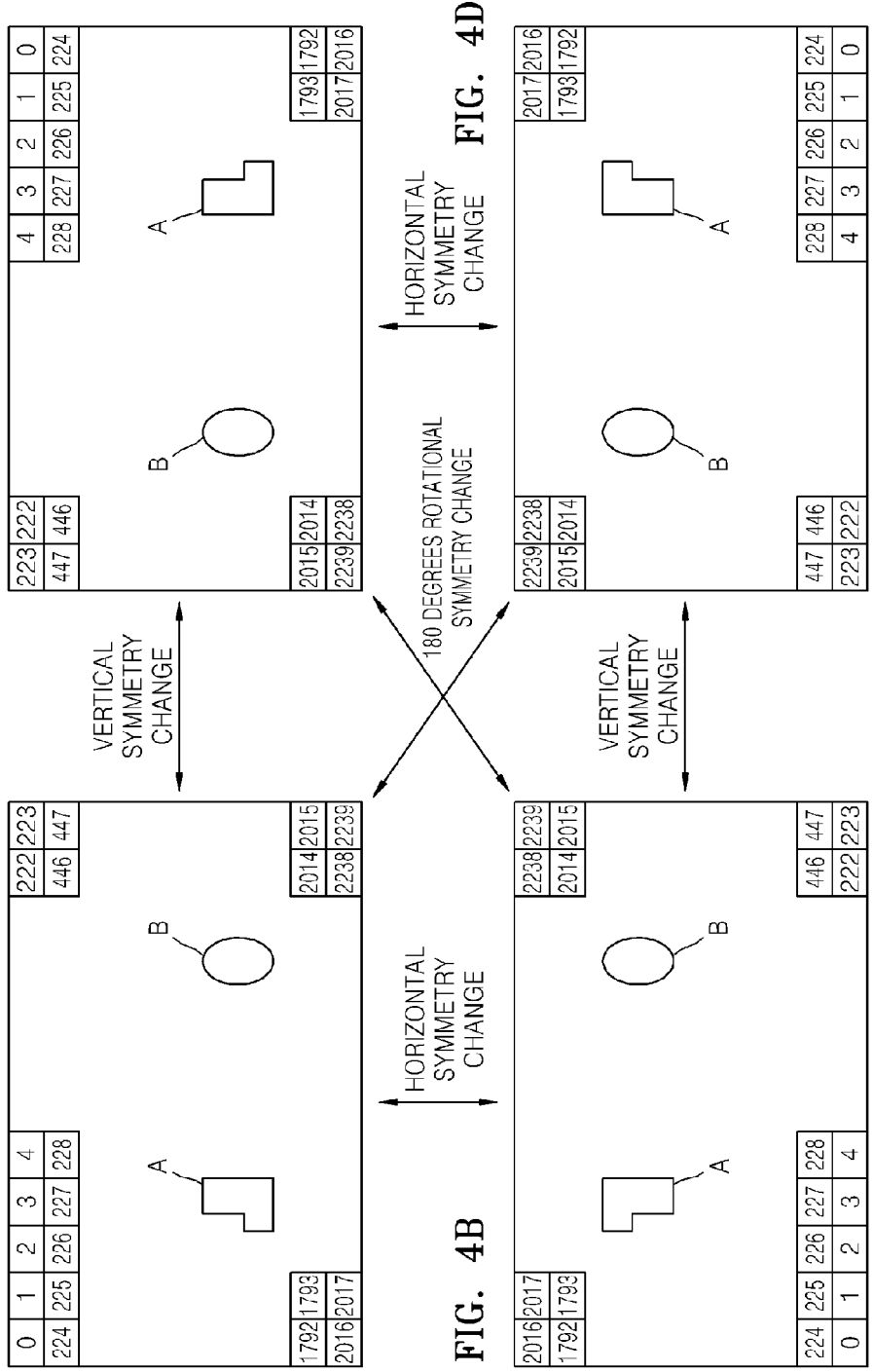

FIG. 6A
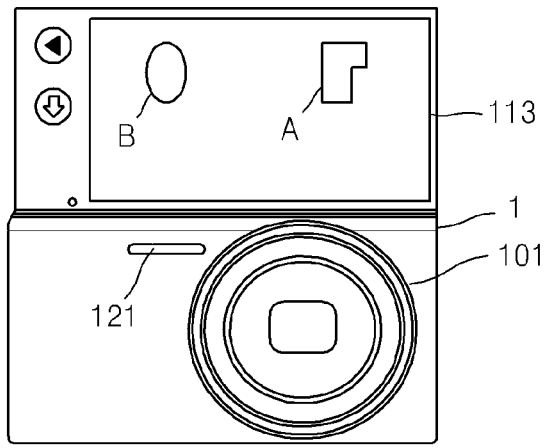
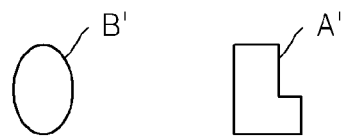
FIG. 6B
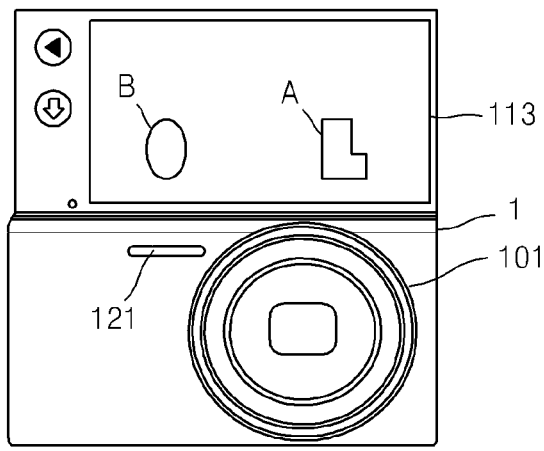

FIG. 8A
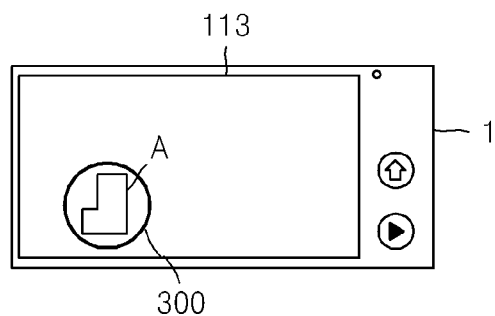
FIG. 8B
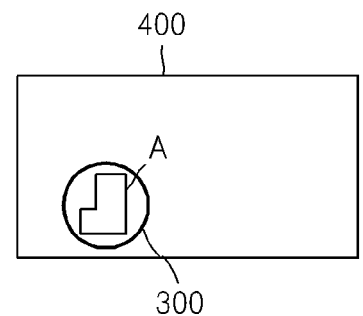
FIG. 8C
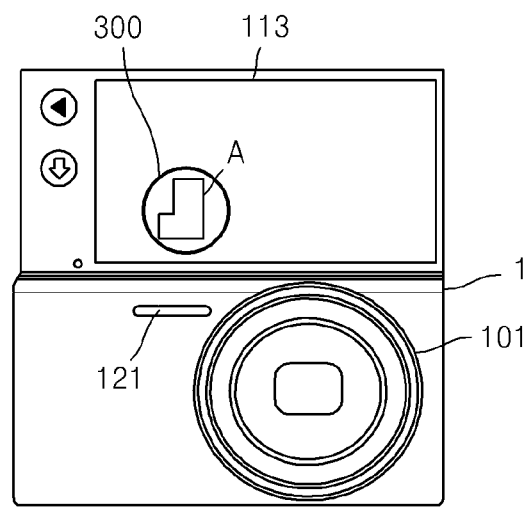
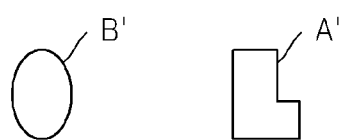

FIG. 11A
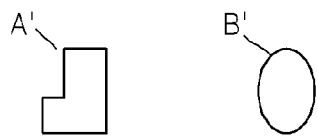
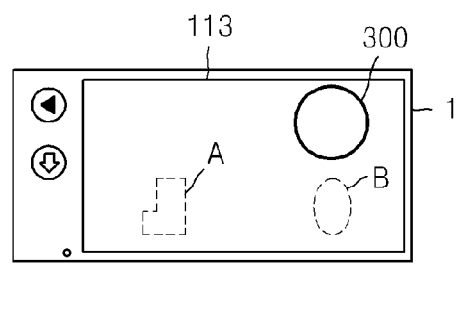
FIG. 11B
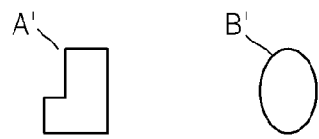
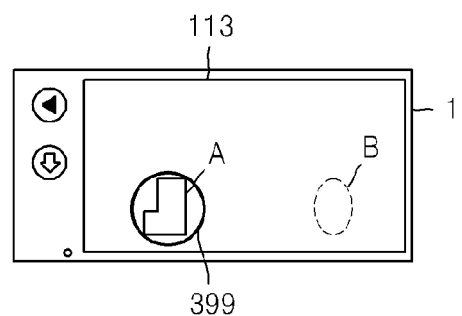
FIG. 11C
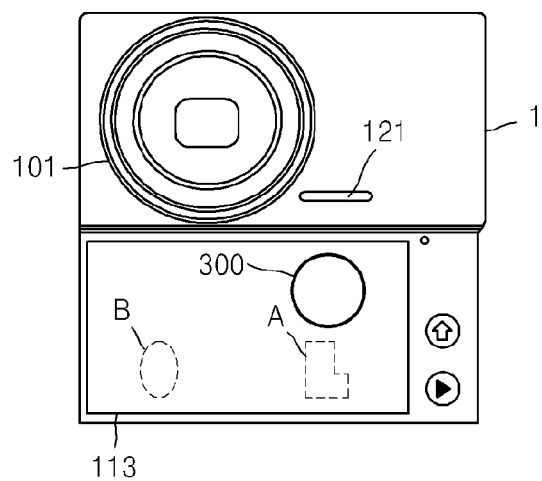
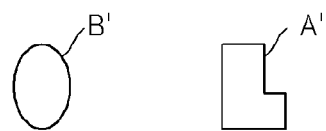
FIG. 11D
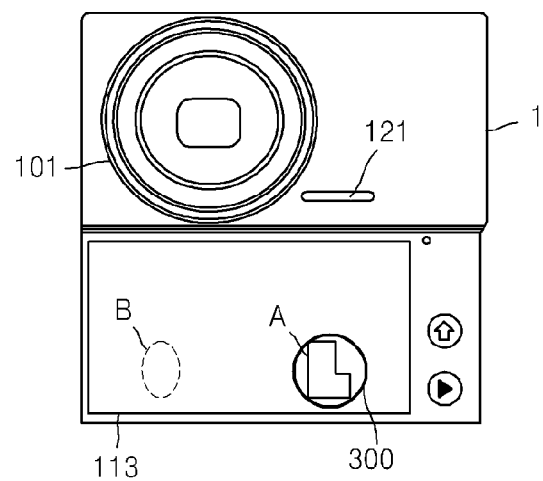
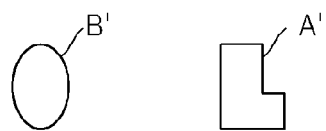

FIG. 12A
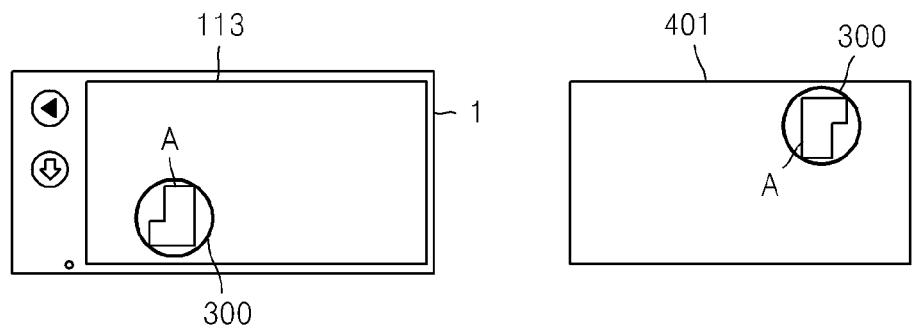
FIG. 12B
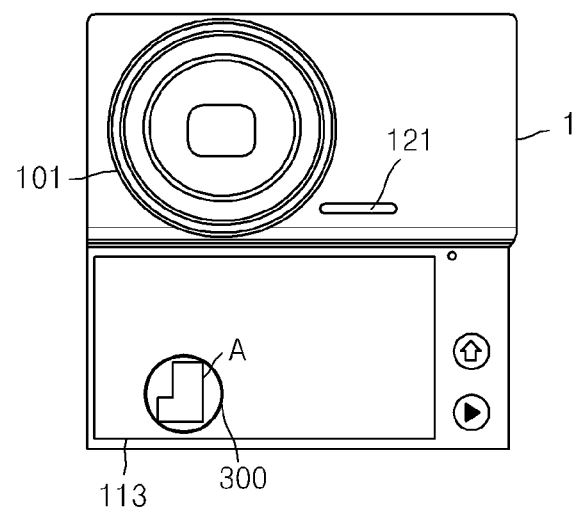
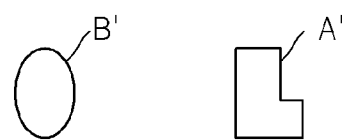

CHANGING AN ORIENTATION OF A DISPLAY OF A DIGITAL PHOTOGRAPHING APPARATUS ACCORDING TO A MOVEMENT OF THE APPARATUS

CROSS-REFERENCE TO RELATED PATENT APPLICATION

This application claims the benefit of Korean Patent Application No. 10-2011-0120320, filed on Nov. 17, 2011, in the Korean Intellectual Property Office, the disclosure of which is incorporated herein in its entirety by reference.

BACKGROUND

Various embodiments of the invention relate to a digital photographing apparatus and a method of controlling the same.

Digital photographing apparatuses, such as digital cameras or camcorders, are easy to carry because of miniaturization of the digital photographing apparatuses and technological development of, for example, a battery, and thus, the digital photographing apparatuses may easily capture an image anywhere. Also, the digital photographing apparatuses provide various functions that may allow even a layman to easily capture an image.

In addition, digital photographing apparatuses provide various functions to cater to users' diversified tastes, for example, a self-photography function, a function of composing a captured image with a previously-stored image, i.e., a template, and the like.

SUMMARY

Various embodiments provide a digital photographing apparatus that enables a user to naturally perform a self-photography function, and a method of controlling the digital photographing apparatus.

According to an embodiment, there is provided a digital photographing apparatus including: an imaging device that generates an image signal by capturing image light; a storage unit that stores a template including a background area and a composite area that shows at least a part of an image according to the image signal; an image changing unit that changes orientations of the template and the image; an image composing unit that composes the image and the template of which orientations are changed; and a display unit that displays the composed image, wherein the image changing unit determines orientations to be changed of the template and the image according to a rotation amount of the imaging device with respect to an optical axis of the image light and an orientation in which an imaging surface of the imaging device faces.

When the orientation in which the imaging surface faces is the same as an orientation in which the display unit faces, the image changing unit may perform a horizontal symmetry change on the template and the image.

The image composing unit may generate a photographing image obtained by composing the image and the template on which changes in orientation are not performed according to a photographing signal, and when the photographing image is reproduced in a state where the rotation amount of the imaging device and the orientation of the display unit are the same as those during a photographing operation, a 180 degrees rotational symmetry change may be performed on the photographing image with respect to a center of the photographing image to display the photographing image on the display unit.

When the orientation in which the imaging surface faces is the same as the orientation in which the display unit faces and when the rotation amount of the imaging device is equal to or over a reference value, a horizontal symmetry change may be performed on the image and a vertical symmetry change is performed on the template.

The image composing unit may generate a photographing image obtained by composing the image on which a change in orientation is not performed with a template on which a 180 degrees rotational symmetry change is performed according to a photographing signal, and when the photographing image is reproduced in a state where the rotation amount of the imaging device and the orientation of the display unit are the same as those during a photographing operation, a 180 degrees rotational symmetry change may be performed on the photographing image with respect to a center of the photographing image to display the photographing image on the display unit.

An upper surface of the display unit may be supported by the digital photographing apparatus to rotate.

The display unit may rotate between an orientation in which an imaging surface of the imaging device faces and an opposite orientation thereof.

The digital photographing apparatus may further include a position sensor that determines whether the display unit rotates at an angle equal to or over a reference angle.

The digital photographing apparatus may further include a movement sensor that senses a rotation amount of the imaging device with respect to the optical axis.

The digital photographing apparatus may further include a template determination unit that determines whether the composite area of the template has a directional property.

When the composite area has a directional property, the image changing unit may separately perform changes in orientation on the composite area and the background area.

When the composite area has a directional property, the image changing unit may perform a change in orientation so that the orientation of the composite area is the same as an orientation of the image.

The digital photographing apparatus may further include a composite area setting unit that sets a position of the composite area of the template.

The digital photographing apparatus may further include a memory that stores the image signal; and a memory controller that controls the storage of the image signal, wherein the memory controller changes an order of addresses storing the image signal in the memory according to the rotation amount of the imaging device with respect to the optical axis of the image light and an orientation in which the display unit faces with respect to the orientation in which the imaging surface of the imaging device faces.

The memory controller may store the image signal in the memory by using a direct memory access (DMA) method.

According to another embodiment, there is provided a method of controlling a digital photographing apparatus, the method including: generating an image signal by capturing image light; selecting a template including a background area and a composite area that indicates at least a part of an image according to the image signal; changing orientations of the template and the image according to a movement of the digital photographing apparatus; composing the image and the template of which orientations are changed; and displaying the composed image.

The movement of the digital photographing apparatus may include a rotation amount of an imaging device with respect to an optical axis of the image light and an orientation in which a display unit faces with respect to an orientation in which an imaging surface faces.

When the orientation in which the imaging surface faces is opposite to the orientation in which the display unit faces, a horizontal symmetry change may be performed on the template and the image.

When the orientation in which the imaging surface faces is opposite to the orientation in which the display unit faces and when the rotation amount of the imaging device is equal to or over a reference value, a horizontal symmetry change may be performed on the image and a vertical symmetry change is performed on the template.

The method may further include generating a photographing image obtained by composing the image and the template on which changes in orientation are not performed according to a photographing signal; and when the photographing image is reproduced in a state where the rotation amount of the imaging device and the orientation of the display unit are the same as those during a photographing operation, performing a 180 degrees rotational symmetry change on the photographing image with respect to a center of the photographing image to display the photographing image on the display unit.

BRIEF DESCRIPTION OF THE DRAWINGS

The above and other features and advantages of the invention will become more apparent by describing in detail exemplary embodiments thereof with reference to the attached drawings in which:

FIG. 4A to 4D are a view showing a process of converting an image, according to an embodiment;

FIGS. 6A to 7C are views showing the digital photographing apparatus of FIG. 1 that performs a photographing operation;

FIGS. 8A to 8C are views showing the digital photographing apparatus of FIG. 1 that performs an image reproducing operation;

FIGS. 10A to 11D are views showing the digital photographing apparatus of FIG. 1 that performs a photographing operation, according to another embodiment;

FIGS. 12A and 12B are views showing a digital photographing apparatus that performs an image reproducing operation, according to another embodiment;

DETAILED DESCRIPTION

Figure 1:
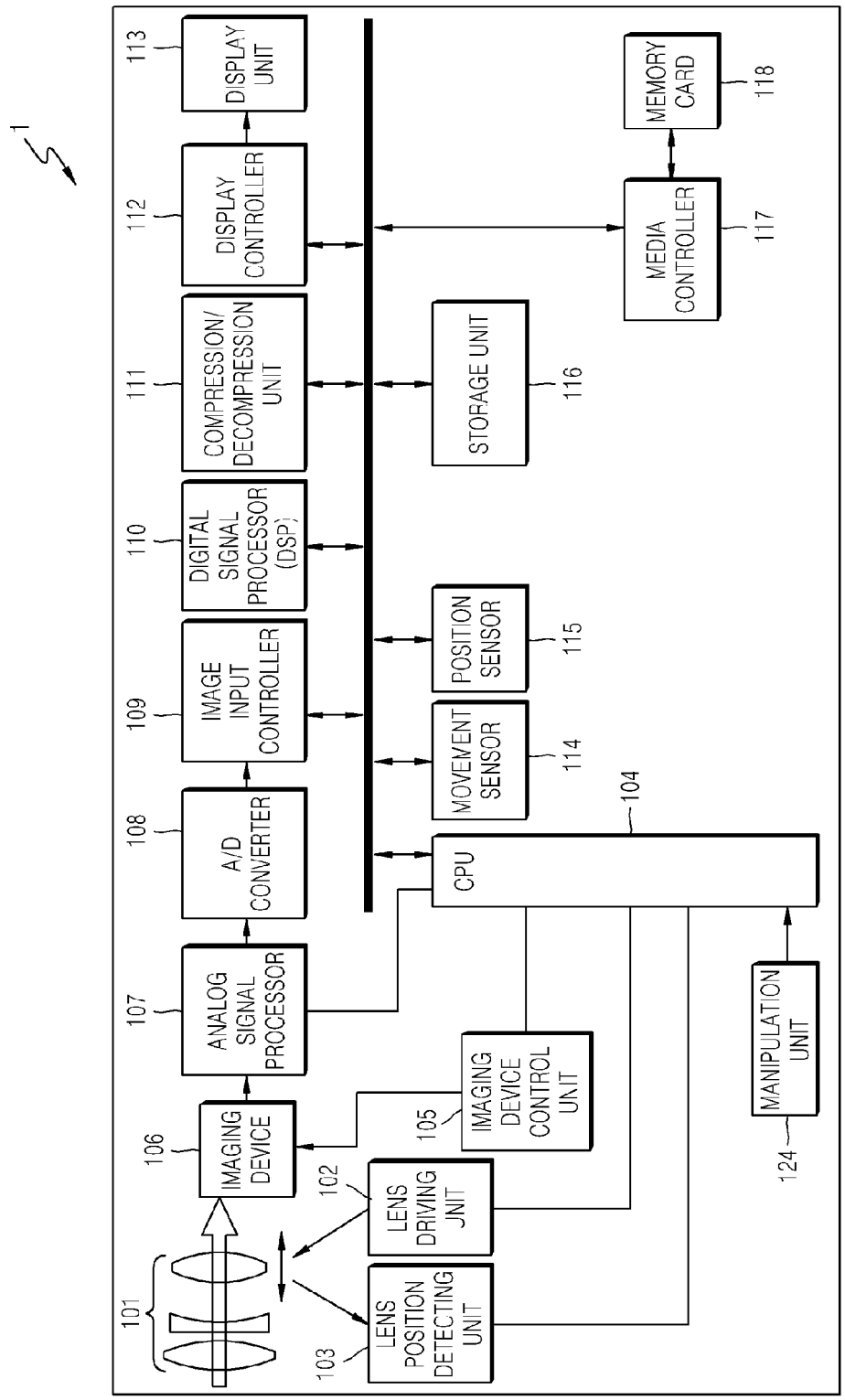
FIG. 1 is a block diagram of a digital photographing apparatus, according to an embodiment.

Hereinafter, the invention will be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, like reference numerals denote like elements. Also, while describing the invention, detailed descriptions about related well-known functions or configurations that may diminish the clarity of the points of the invention are omitted.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the invention will be described in detail by explaining exemplary embodiments of the invention with reference to the attached drawings. The same reference numerals in the drawings denote the same element and the detailed descriptions thereof will be omitted.

Figure 2A:
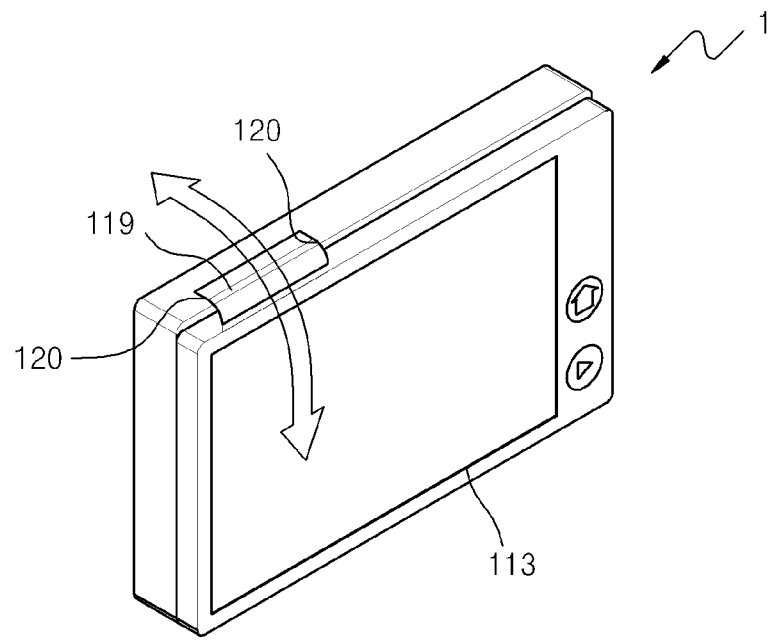
FIGS. 2A and 2B show exteriors of the digital photographing apparatus of FIG. 1.
Figure 2B:
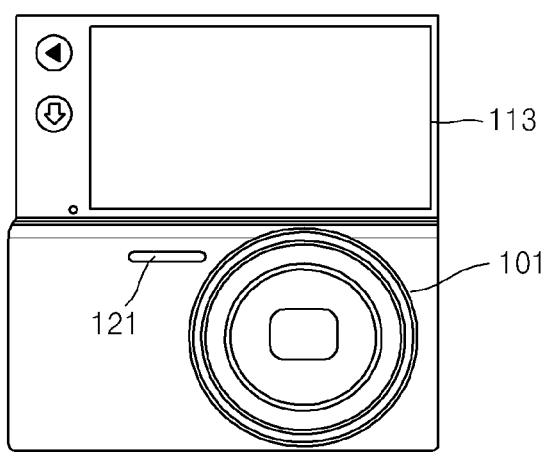

FIG. 1 is a block diagram of a digital photographing apparatus 1, according to an embodiment. FIGS. 2A and 2B show exteriors of the digital photographing apparatus 1 of FIG. 1.

Referring to FIGS. 1 to 2B, the digital photographing apparatus 1 includes a lens 101, a lens driving unit 102, a lens position detecting unit 103, a CPU 104, an imaging device control unit 105, an imaging device 106, an analog signal processor 107, an analog/digital (A/D) converter 108, an image input controller 109, a digital signal processor (DSP) 110, a compression/decompression unit 111, a display controller 112, a display unit 113, a movement sensor 114, a position sensor 115, a storage unit 116, a media controller 117, a memory card 118, a flash 121, and a manipulation unit 124.

The lens 101 includes a focus lens and a zoom lens. The lens 101 may perform a function of controlling a zoom magnification by driving the zoom lens, and may perform a function of controlling a focus by driving the focus lens.

The lens driving unit 102 drives the zoom lens and the focus lens under the control of the CPU 104. The lens driving unit 102 may include a plurality of motors for driving the zoom lens and the focus lens.

The lens position detecting unit 103 detects positions of the zoom lens and the focus lens and transmits a detection result to the CPU 104.

The CPU 104 controls an entire operation of the digital photographing apparatus 1. The CPU 104 may receive manipulation signals from the manipulation unit 124 and transmit commands corresponding to the manipulation signals to components of the digital photographing apparatus 1.

The imaging device control unit 105 generates a timing signal and transmits the timing signal to the imaging device 106, and thus, controls an imaging operation of the imaging device 106. Also, if accumulation of charges in each scan line of the imaging device 106 is finished, the imaging device control unit 105 controls the imaging device 106 to sequentially read an image signal.

The imaging device 106 captures a subject's image light that has passed through the lens 101 to generate an image signal. The imaging device 106 may include a plurality of photoelectric conversion devices arranged in a matrix array, charge transfer lines for transmitting charges from the photoelectric conversion devices, and the like.

The analog signal processor 107 removes noise from the image signal read by the imaging device 106 or amplifies a magnitude of the image signal to an arbitrary level. The A/D converter 108 converts an analog image signal that is output from the analog signal processor 107 into a digital image signal.

The image input controller 109 processes the image signal output from the A/D converter 108 so that an image process may be performed on the image signal in each subsequent component. The image signal output from the image input controller 109 may be temporarily stored in, for example, a synchronous dynamic random access memory (SDRAM) included in the storage unit 116.

The CPU 104 or the DSP 110 perform auto white balance (AWB) processing, auto exposure (AE) processing, and auto focus (AF) processing on the image signal output from the image input controller 109.

The DSP 110 performs a series of image signal processing operations, such as gamma correction, on the image signal output from the image input controller 109 to create a live view image or a captured image that is displayable on the display unit 113.

The compression/decompression unit 111 performs compression or decompression on an image signal on which image signal processing has been performed. Regarding compression, the image signal is compressed in, for example, JPEG compression format or H.264 compression format. An image file, including image data generated by the compression processing, is transmitted to the media controller 117, and the media controller 117 stores the image file in the memory card 118.

The display controller 112 controls an image to be output by the display unit 113. The display unit 113 displays various images, such as a captured image or a live view image, various setting information, and the like. The display unit 113 and the display controller 112 may include a liquid crystal display (LCD) and an LCD driver, respectively. However, the invention is not limited thereto, and the display unit 113 and the display controller 112 may include, for example, an organic light-emitting diode (OLED) display and a driving unit thereof, respectively.

The display unit 113 of the current embodiment may be supported by a body in such a way that a part of the display unit 113 may rotate with respect to the body, as shown in FIGS. 2A and 2B. For example, a part of an upper surface of the display unit 113 may be coupled to the body by a hinge structure. The hinge structure may include a first coupling unit 119 disposed adjacent to the display unit 113 and a second coupling unit 120 disposed adjacent to the body, and the first coupling unit 119 may be supported to rotate with respect to the second coupling unit 120.

The display unit 113 may rotate between an orientation in which an imaging surface of the imaging device 106 faces (a state of FIG. 2B) and an opposite orientation thereof (a state of FIG. 2A) based on the hinge structure. In the current embodiment, the upper surface of the display unit 113 is supported by the digital photographing apparatus 1 to rotate, and thus, the display unit 113 may rotate upward the body of the digital photographing apparatus 1. However, the invention is not limited thereto, and the display unit 113 may rotate in a direction in which the hinge structure is formed.

The movement sensor 114 senses a movement of the digital photographing apparatus 1, generates a sensing signal according to the sensed movement, and transmits the sensing signal to the CPU 104. The movement sensor 114 may sense an amount by which the imaging device 106 rotates with respect to an optical axis of image light (hereinafter, referred to as a rotation amount of the imaging device 106). For example, an acceleration sensor may be used as the movement sensor 114.

The acceleration sensor includes a fixed conductor and a movable conductor. The acceleration sensor senses a change of velocity occurring under a range of an acceleration of gravity g when the digital photographing apparatus 1 in which the acceleration sensor is installed moves, and thus, the digital photographing apparatus 1 generates data by using the change. The CPU 104 may calculate an inclined angle by using the generated data. The digital photographing apparatus 1 of the current embodiment uses data regarding clockwise or counterclockwise movement with respect to an optical axis from among movements sensed by the acceleration sensor. Thus, the digital photographing apparatus 1 may properly perform a change in orientation with respect to an image according to an angle at which the display unit 113 is rotated and may display the image on which the change is performed.

The position sensor 115 senses a state of the display unit 113, generates a state signal according to the sensed state of the display unit 113, and transmits the state signal to the CPU 104. The position sensor 115 determines whether the display unit 113 is in a normal state (see FIG. 2A) in which the display unit 113 is in an opposite orientation to the imaging surface of the imaging device 106 or the display unit 113 is in a flipped state (see FIG. 2B) in which the display unit 113 is in the same orientation as the imaging surface of the imaging device 106. For example, a hole sensor may be used as the position sensor 115. If the display unit 113 rotates at an angle equal to or over a reference angle with respect to the body, the position sensor 115 senses a state of the display unit 113 as a flipped state. For example, if the display unit 113 rotates at an angle equal to or over 150° based on when the display unit 113 faces an opposite orientation to the imaging surface of the imaging device 106, the position sensor 115 may determine that the display unit 113 is in a flipped state. However, the invention is not limited thereto, and the angle may be modified in various ways.

When a hole sensor is used as the position sensor 115, if the display unit 113 is flipped, output is changed in response to magnetic force. The CPU 104 senses the output to determine whether the display unit 113 is in a flipped state.

The storage unit 116 stores various data and signals. The storage unit 116 may temporarily store information regarding an image to be displayed on the display unit 113 and may store an executable program for controlling the digital photographing apparatus 1 and various management information.

The storage unit 116 may store a template to be composed with a captured image. The template is an image used to compose with an image captured by a user. The template includes a background area and a composite area for displaying at least a part of an image according to a captured image signal.

The storage unit 116 of the current embodiment may include a memory for storing an image signal and a memory controller for controlling storage of the image signal. The memory controller may control input and output of the image signal by using a direct memory access method. In this regard, the memory controller may determine a method of inputting and outputting the image signal according to an orientation in which the display unit 113 faces, that is, a state of the display unit 113, a rotation amount of the imaging device 106, and the like. An operation of the memory controller will be described in detail with reference to FIG. 4.

The flash 121 radiates light on a subject during a photographing operation.

The manipulation unit 124 is a unit through which a user inputs various commands for manipulating the digital photographing apparatus 1. The manipulation unit 124 may include various buttons such as a shutter release button, a main switch, a mode dial, a menu button, or the like.

In FIG. 1, the lens 101 is formed integrally with the body, but the invention is not limited thereto. For example, the digital photographing apparatus 1 may have a structure in which a lens module including the lens 101, the lens driving unit 102, and the lens position detecting unit 103 are detachably attached to the body.

When the digital photographing apparatus 1 has a structure in which the lens module is detachably attached to the body, the lens module may include a separate control unit. The control unit included in the lens module may perform driving and position detecting of the lens 101 according to a command from the CPU 104 of the body.

Also, although not shown in FIG. 1, the digital photographing apparatus 1 may further include a shutter, an aperture, and the like. FIG. 1 shows only components necessary for describing the embodiments of the invention, and the digital photographing apparatus 1 may further include various other components.

Figure 3:
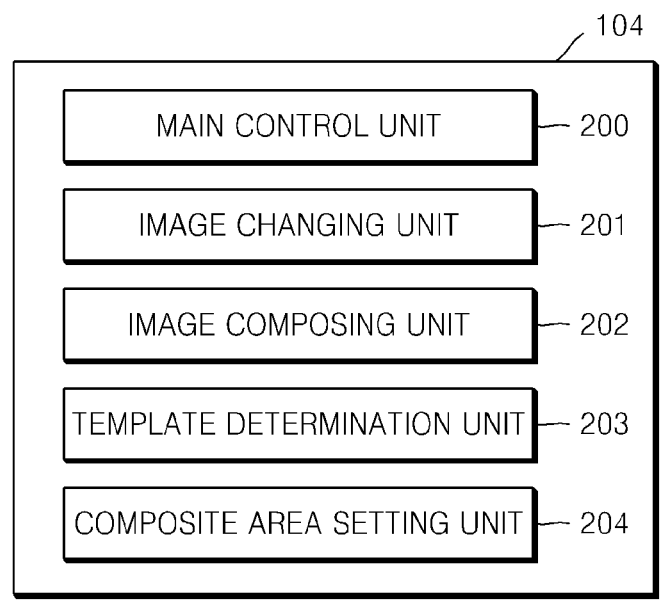
FIG. 3 is a block diagram of a central processing unit (CPU), according to an embodiment.

FIG. 3 is a block diagram of the CPU 104, according to an embodiment.

Referring to FIG. 3, the CPU 104 includes a main control unit 200, an image changing unit 201, an image composing unit 202, a template determination unit 203, and a composite area setting unit 204.

The main control unit 200 controls operations of components of the CPU 104 and the digital photographing apparatus 1.

The image changing unit 201 changes an orientation of a template, which is selected from the templates stored in the storage unit 116, and a captured image. The change in orientation may include a vertical symmetry change, a horizontal symmetry change, and a 180 degrees rotational symmetry change.

The image changing unit 201 may determine whether to change orientations of an image and a template according to the rotation amount of the imaging device 106, and when the orientations of the image and the template are changed, the image changing unit 201 may determine orientations in which the image and the template are changed. Also, the image changing unit 201 may determine whether to change orientations of an image and a template according to a state of the display unit 113, that is, according to whether the display unit 113 is flipped or not, and when the orientations of the image and the template are changed, the image changing unit 201 may determine orientations in which the image and the template are changed.

When a user does not use a template, the image changing unit 201 performs a change in orientation only with respect to an image. When the user uses a template, the image changing unit 201 performs a change in orientation with respect to an image and the template separately.

The image composing unit 202 composes an image and a template, of which an orientation is changed respectively.

During the composing of the image and the template, a captured image is displayed only on a composite area, and an image of a background area of the template is displayed on the other area.

When a user uses a template, the template determination unit 203 determines whether a composite area has a directional property in the set template. In this regard, the directional property refers to a shape of the composite area that does not change even when the composite area is rotated. For example, when the composite area has a circular shape, the template determination unit 203 determines that the composite area does not have a directional property. On the contrary, when the composite area has a heart shape, a star shape, or the like, the template determination unit 203 determines that the composite area has a directional property.

When the template determination unit 203 determines that the composite area of the set template has a directional property, the template determination unit 203 transmits a determination result to the image changing unit 201.

The image changing unit 201 may perform a change in orientation with respect to a background area and the composite area of the set template according to the determination result of the template determination unit 203 in terms of a change in orientation of the template. When the template determination unit 203 determines that the composite area of the set template has a directional property, the image changing unit 201 performs a change in orientation with respect to the background area and the composite area separately. That is, the image changing unit 201 may perform a change in orientation so as to maintain the directional property of the composite area. In other words, the image changing unit 201 may perform a change in orientation so that an orientation of the composite area corresponds to an orientation of an image to be composed. When the template determination unit 203 determines that the composite area of the set template does not have a directional property, the image changing unit 201 performs a change in orientation with respect to the background area and the composite area in the same way.

The composite area setting unit 204 sets a position of the composite area of the template. A user may set a desired position of the composite area by adjusting the position of the composite area via the manipulation unit 124. Also, when there are candidate composite areas having various shapes, a user may select a composite area having a desired shape and set the composite area in a desired position.

In the current embodiment, the CPU 104 includes the image changing unit 201, the image composing unit 202, the template determination unit 203, and composite area setting unit 204, but the invention is not limited thereto. For example, the DSP 110 may include all the above-described components of the CPU 104, or the CPU 104 may include some of the components and the DSP 110 may include the rest.

Hereinafter, conversion of an image will be described.

FIGS. 4A to 4D are views showing a process of converting an image, according to an embodiment. FIGS. 4A to 4D show various changes in orientation of an image signal generated by being captured by the DSP 110. In FIGS. 4A to 4D, an image with 224 pixels across and 10 pixels down contains a total of 2240 pixels.

For ease of understanding the current embodiment, it is assumed that images shown in FIGS. 4A to 4D are memories and a position of each image is an address of the memory. In other words, the image of FIG. 4A shows a case where a pixel number corresponds to an address number. Also, it is assumed that numbers 0 to 2239 are pixel numbers when FIG. 4A is a reference image.

Based on the above-described assumption, referring to the image of FIG. 4A, a subject A and a subject B are photographed and stored in the memory as shown in FIGS. 4A to 4D. In other words, data of pixels 0 to 223 are stored in areas corresponding to addresses 0 to 223 of the memory. Then, data of pixels 224 to 337 are sequentially stored in areas having subsequent address values of the memory. As described above, data of from a left upper pixel to a right lower pixel are sequentially stored in order of increasing address of the memory. That is, the order of data to be input is the same as the order of addresses to be stored in the memory.

The memory controller may allow a captured image to be displayed on the display unit 113 in a state where an orientation of the captured image is maintained by sequentially reading the image signal stored as shown in FIG. 4A in order of increasing address. In other words, the memory controller allows the order of data of the image to be input to be the same as the order of data of the image to be output.

Hereinafter, a case where a horizontal symmetry change is performed on an image will be described.

The image of FIG. 4B shows a case where a horizontal symmetry change is performed on an image captured as shown in the image of FIG. 4A. Referring to the image of FIG. 4B, data of pixels 0 to 223 are stored in areas corresponding to the last 224 addresses of the memory. In other words, data of pixels 0 to 223 are stored in areas corresponding to addresses 2016 to 2239 of the memory. Then, data of pixels 224 to 447 to be input next are stored in areas corresponding to addresses 1792 to 2015 of the memory. As described above, when the horizontal symmetry change is performed on an image, an order of data of pixels is inversed in a unit of a horizontal line, and then the data is stored in the memory.

The memory controller may allow a captured image reversed vertically to be displayed on the display unit 113 by sequentially reading the image signal stored as shown in the image of FIG. 4B in order of increasing address of the memory.

Hereinafter, a case where a vertical symmetry change is performed on an image will be described.

The image of FIG. 4C shows a case where a vertical symmetry change is performed on an image captured as shown in the image of FIG. 4A. Referring to the image of FIG. 4C, data of pixels 0 to 223 are stored in areas corresponding to the first 224 addresses of the memory. However, data of a pixel having a large number is stored in an area corresponding to a low address from among the 224 addresses. Then, data of pixels 224 to 447 to be input next are stored in areas corresponding to addresses 224 to 447 of the memory. However, similar to the previous line, data of pixels having large numbers are stored in areas corresponding to low addresses from among the 224 addresses. As described above, when the vertical symmetry change is performed on an image, an order of data of pixels is inversed in a unit of a vertical line, and then the data is stored in the memory.

The memory controller may allow a captured image that is reversed horizontally to be displayed on the display unit 113 by sequentially reading the image signal stored as shown in the image of FIG. 4C in order of increasing address of the memory.

Hereinafter, a case where a 180 degrees rotational symmetry change is performed on an image will be described.

The image of FIG. 4D shows a case where a 180 degrees rotational symmetry change is performed on an image captured as shown in the image of FIG. 4A. Referring to the image of FIG. 4D, data of pixels 0 to 223 are stored in areas corresponding to the last 224 addresses of the memory. In other words, data of pixels 0 to 223 are stored in areas corresponding to addresses 2016 to 2239 of the memory. However, data of pixels having large numbers are stored in areas corresponding to low addresses from among the 224 addresses. Then, data of pixels 224 to 447 to be input next are stored in areas corresponding to addresses 1792 to 2015 of the memory. However, similar to the previous line, data of pixels having large numbers are stored in areas corresponding to low addresses from among the 224 addresses. As described above, when the 180 degrees rotational symmetry change is performed on an image as shown in the image of FIG. 4D, values of the addresses of the memory storing data of pixels are opposite to the values of the addresses of the memory shown in the image of FIG. 4A.

The memory controller may allow a captured image reversed horizontally to be displayed on the display unit 113 by sequentially reading the image signal stored as shown in the image of FIG. 4D in order of increasing address of the memory.

The above-described change in orientation and storing of the pixels (or an image) may be performed by the above-described storage unit 116. The memory controller may store data of a pixel, that is, an image signal, by using a direct memory access (DMA) method. In other words, the memory controller receives information regarding a state of the display unit 113 from the CPU 104 and changes addresses of the memory storing data of the image signal according to the received information to perform a change in orientation on an image. In this regard, the state of the display unit 113 may be a rotation amount of the imaging device 106 with respect to an optical axis and a flipped state of the display unit 113.

Hereinafter, the invention will be described with reference to the descriptions with regard to the above embodiments.

Figure 5A:
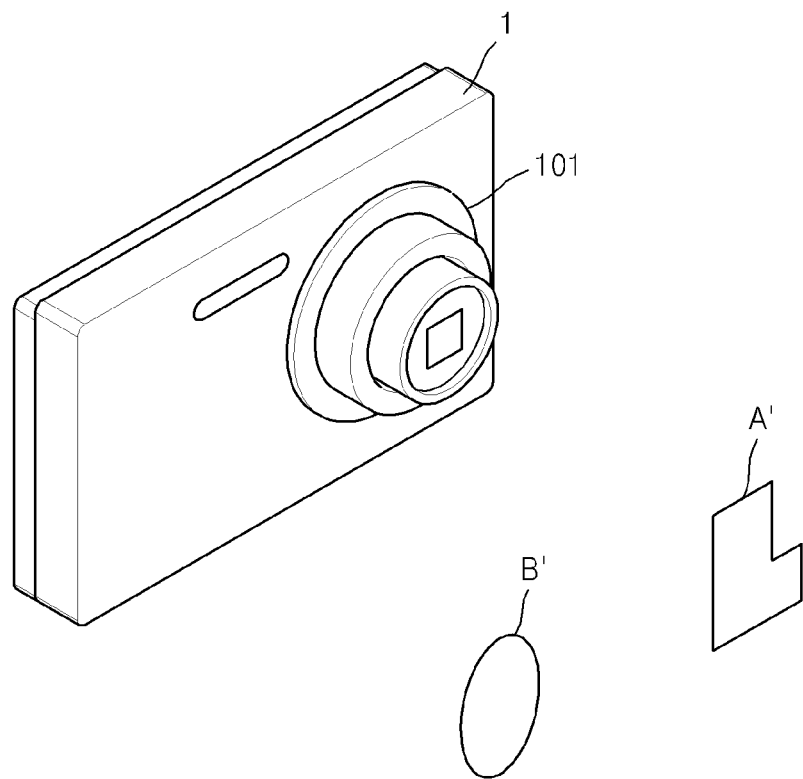
FIGS. 5A and 5B are views showing the digital photographing apparatus of FIG. 1 that performs a photographing operation.
Figure 5B:
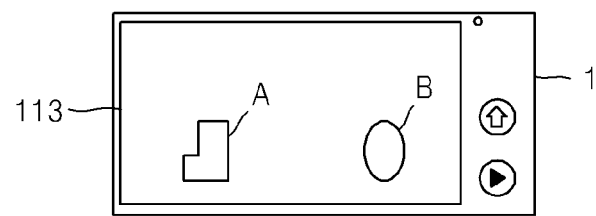

FIGS. 5A and 5B are views showing the digital photographing apparatus 1 that performs a photographing operation. Referring to FIG. 5A, a subject A' and a subject B' are captured by the digital photographing apparatus 1. Referring to FIG. 5B, images A and B obtained by capturing the subjects A' and B' are displayed on the display unit 113. In the current embodiment, in order to distinguish real subjects from subjects of captured images, the subjects of the captured images are represented by A and B, and the real subjects are represented by A' and B'.

In FIGS. 5A and 5B, the digital photographing apparatus 1 is in a general state, that is, a state where a rotation amount of the imaging device 106 is close to 0, which is less than a reference value, and the display unit 113 is in an unflipped state, and thus, an orientation of an image does not need to be changed.

FIGS. 6A to 7C are views showing the digital photographing apparatus 1 that performs a photographing operation.

Referring to FIG. 6A, the display unit 113 is in a flipped state. A rotation amount of the imaging device 106 is less than a reference value. An image captured in a state where the display unit 113 is not flipped is shown in FIG. 5B. When the display unit 113 is flipped, if a change in orientation is not performed on an image, the image is as shown in FIG. 6A.

However, a state where the display unit 113 is flipped means that a user has the same orientation as a subject, and thus, the user may feel inconvenienced due to a captured image displayed upside down.

Referring to FIG. 6B, a horizontal symmetry change is performed on a captured image. Thus, a user may naturally perform the horizontal symmetry change in orientation when performing a self-photography function.

The image displayed on the display unit 113 of FIG. 6B is reversed horizontally compared to an image to be actually captured (see FIG. 5B). Accordingly, when the display unit 113 is flipped, a vertical symmetry change in orientation as well as the horizontal symmetry change in orientation may be performed on the image.

However, when the vertical symmetry change is additionally performed on the image, a direction in which the digital photographing apparatus 1 moves is opposite to a direction in which the image disposed on the display unit 113 moves so that a user may not easily use the digital photographing apparatus 1. For example, when the vertical symmetry change is additionally performed on the image, it is assumed that an orientation of the digital photographing apparatus 1 is changed to face the subject B'. When a user having the same orientation as the subjects A' and B' sees the display unit 113, the user may feel as if the display unit 113 moves to the left and a captured image moves to the right. Accordingly, when the display unit 113 is flipped, it is more natural for the user to maintain a state of the image reversed horizontally. That is, it is preferable that the image is processed to generate a mirror effect.

Hereinafter, a case where a self-photography function is performed using a template will be described with reference to FIGS. 7A to 7C.

Figure 7A:
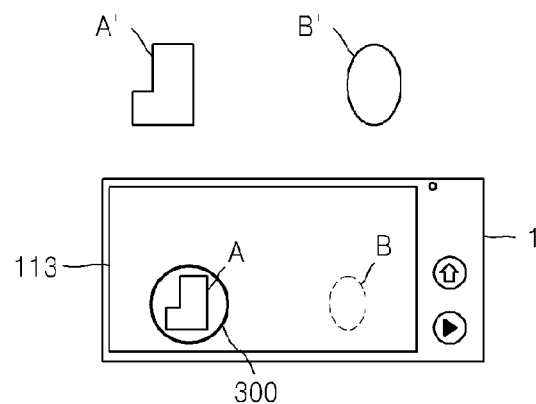

Referring to FIG. 7A, the display unit 113 is in an unflipped state. A rotation amount of the imaging device 106 is less than a reference value. Referring to FIG. 7A, a user sets a template to be used, and thus, the template is displayed on the display unit 113. The template includes a composite area 300 represented as a circle.

Although a user is photographing the subjects A' and B', only a part positioned in the composite area 300 in a captured image may be displayed. Accordingly, an image A of the subject A' is displayed on the composite area 300, while an image B of the subject B' is hidden by a background area and thus is not displayed.

Figure 7B:
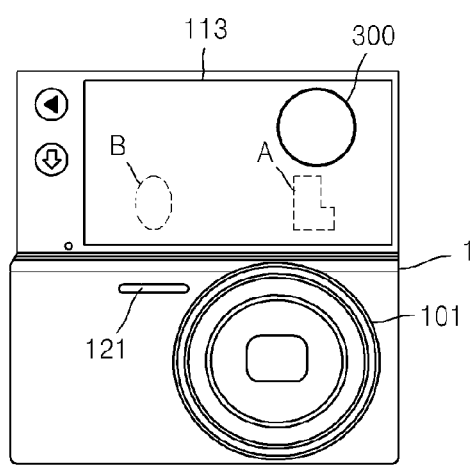

Referring to FIG. 7B, the display unit 113 is in a flipped state, as shown in FIGS. 6A and 6B. A rotation amount of the imaging device 106 is less than a reference value.

As described above, when the display unit 113 is flipped, a horizontal symmetry change needs to be performed on a captured image. Accordingly, images A and B of the subjects A' and B' are positioned as represented by dashed lines.

However, if a change in orientation is not performed on a template, the composite area 300 is positioned at a left lower side (corresponding to a right upper side when the display unit 113 is in a flipped state) of the display unit 113. Accordingly, unlike FIG. 7A, the image A of the subject A' is not displayed on the composite area 300 as shown in FIG. 7B.

Figure 7C:
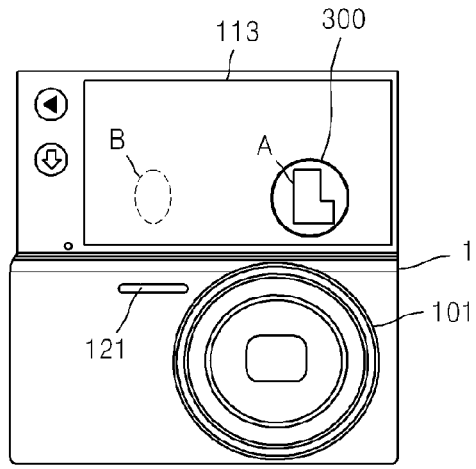

Referring to FIG. 7C, a horizontal symmetry change is performed on the template, similar to the captured image. That is, a change is performed on both the template and the image to generate a mirror effect. Accordingly, a position of the composite area 300 is changed from a right upper side to a right lower side on the display unit 113 shown in FIG. 7C. Then, the image of the subject A' is displayed in the composite area 300.

As such, a change in orientation is performed on the template set by a user as well as the captured image according to the state of the display unit 113 and the rotation amount of the imaging device 106, and thus, the user may naturally perform a self-photography function.

FIGS. 8A to 8C are views showing the digital photographing apparatus 1 that performs an image reproducing operation.

Referring to FIGS. 8A to 8C, if the subject A' is photographed using a template, the photographed subject A' is as shown in FIG. 8A. Then, if a user presses a shutter-release button of the digital photographing apparatus 1 to apply a photographing signal, an image is captured.

When the image is captured, the captured image is generated by composing an image captured by the imaging device 106 and a template in a state where changes in orientation are not performed on the image and the template. That is, unlike an image displayed on the display unit 113 that is in a flipped state, a captured image may be generated by composing an image and a template on which horizontal symmetry changes are not performed.

A captured image 400 is stored as shown in FIG. 8B. In other words, in the captured image 400, a composite area 300 of the template is positioned at a left lower side and an image A of the subject A' is positioned in the composite area 300.

If an image is captured, the digital photographing apparatus 1 displays a quick-view image on the display unit 113. The quick-view image is an image that is temporarily displayed so that a user may verify the captured image.

As shown in FIG. 7C, when an image and a template are reversed only vertically to be displayed on the display unit 113, an image reversed vertically is displayed as a live-view image compared to an image to be actually captured. However, the quick-view image is an image that is provided for a user to verify an image that is actually captured. Accordingly, when an image is captured in a state where the display unit 113 is flipped, it is preferable that the quick-view image is displayed as shown in FIG. 8B.

Thus, as shown in FIG. 8C, the quick-view image is displayed after capturing the image. If a state of the display unit 113 and a rotation amount of the imaging device 106 are the same as those when the image is captured, an image of which orientation is reversed horizontally, compared to a live-view image, should be displayed. The quick-view image shown in FIG. 8C is an image on which a 180 degrees rotational symmetry change is performed based on a stored captured image.

As described above, when the display unit 113 is in a flipped state and a rotation amount of the imaging device 106 is less than a reference value, a horizontal symmetry change should be performed on both the live-view image and the template to display the live-view image and the template. Also, when the quick-view image is displayed after the image is captured, if the digital photographing apparatus 1 is in the same state as described above, the captured image on which a 180 degrees rotational symmetry change is performed should be displayed.

Figure 9A:
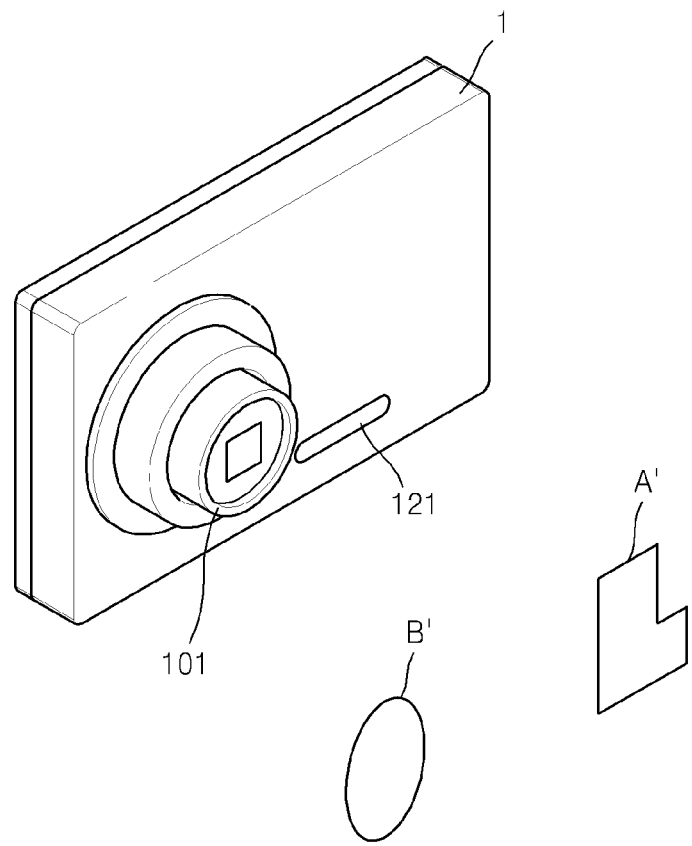
FIGS. 9A and 9B are views showing the digital photographing apparatus of FIG. 1 that performs a photographing operation.
Figure 9B:
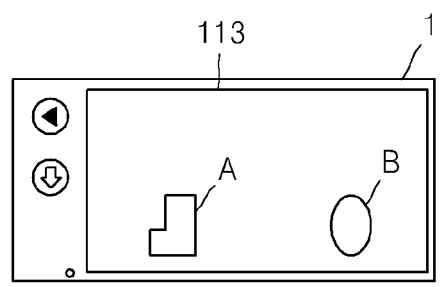

FIGS. 9A and 9B are views showing the digital photographing apparatus 1 that performs a photographing operation. Referring to FIG. 9A, subjects A' and B' are photographed by the digital photographing apparatus 1. Referring to FIG. 9B, images A and B of the subjects A' and B' are displayed on the display unit 113.

FIGS. 9A and 9B show a case where a user is holding the digital photographing apparatus 1 upside down, that is, where a rotation amount of the imaging device 106 is close to 180 degrees, which is equal to or over a reference value, and the display unit 113 is not flipped. Since the imaging device 106 is rotated 180 degrees, a captured image is rotated 180 degrees, and thus the same effect as if the image is rotated 180 degrees is achieved, as compared to when the imaging device 106 is in a normal state. However, because the imaging device 106 is rotated, the display unit 113 is rotated 180 degrees, and thus, a user may not sense an effect as if an image is rotated.

FIGS. 10A to 11D are views showing the digital photographing apparatus 1 of FIG. 1 that performs a photographing operation, according to another embodiment.

Figure 10A:
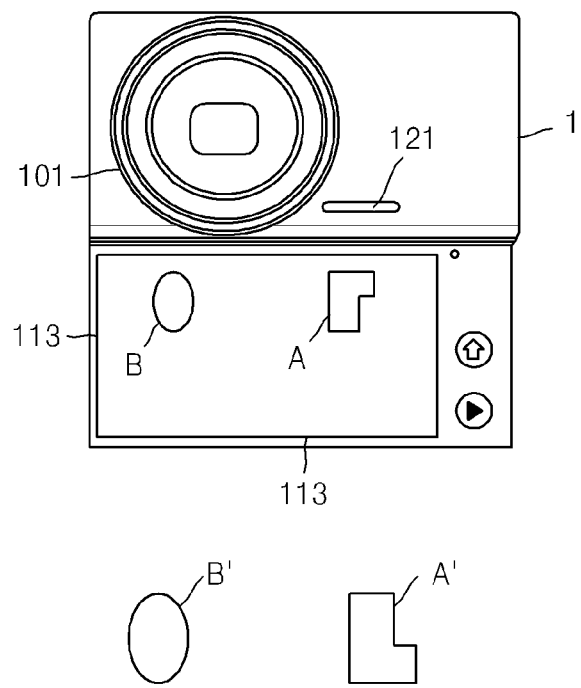

Referring to FIG. 10A, the display unit 113 is in a flipped state. A rotation amount of the imaging device 106 is equal to or over a reference value. For example, the reference value may be 150 degrees. However, the invention is not limited thereto. The reference value may be determined to be an arbitrary value that allows a user to sense as if the digital photographing apparatus 1 is reversed vertically.

An image captured in a state where the display unit 113 is not flipped is as shown in FIG. 9B. When the display unit 113 is flipped, if a change in orientation is not performed on the image, the image is displayed as shown in FIG. 10A.

However, a state where the display unit 113 is flipped means that a user has the same orientation as a subject, and thus, the user may feel inconvenienced due to a captured image being displayed upside down.

Figure 10B:
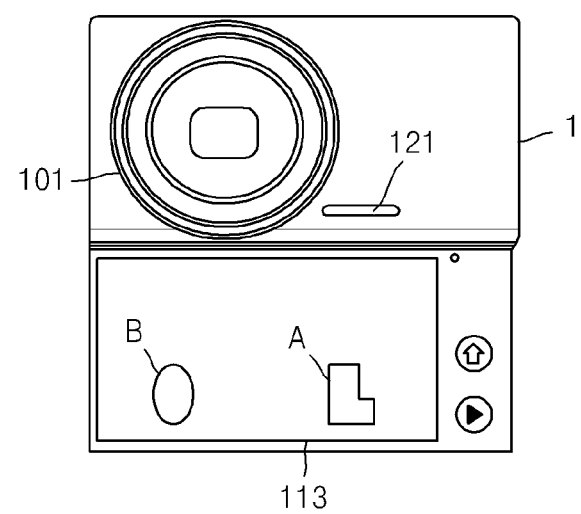

Referring to FIG. 10B, a horizontal symmetry change is performed on a captured image. Thus, a user may naturally perform the horizontal symmetry change when performing a self-photography function. In this regard, as described above, it is preferable that the user does not perform an additional horizontal reversal on an image when the user is naturally performing the self-photography function.

Hereinafter, an embodiment where a self-photography function is performed using a template will be described with reference to FIGS. 11A to 11D.

Referring to FIG. 11A, the display unit 113 is in an unflipped state. A rotation amount of the imaging device 106 is equal to or over a reference value. Referring to FIG. 11A, a user sets a template to be used, and thus, the template is displayed on the display unit 113. The template includes a composite area 300 represented as a circle.

The template used in the current embodiment is the same as the template used in FIGS. 7A to 8C. In this regard, unlike a captured image, the template is displayed regardless of the rotation of the imaging device 106. In other words, the template stored in the storage unit 116 is displayed as it is on the display unit 113.

Since the composite area 300 is positioned at a right upper side in the template used in the current embodiment, the template is displayed as shown in FIG. 11A. A user is photographing subjects A' and B', but only a part positioned in the composite area 300 of a captured image may be displayed. However, in FIG. 11A, both images A and B of the subjects A' and B' are hidden by a background area, and thus, the image A to be composed with the template may not be positioned in the composite area 300.

Referring to FIG. 11B, in order for a user to naturally perform a photographing operation by using a template, the template is horizontally reversed 180 degrees to be displayed on the display unit 113. Thus, similar to a case where a user holds the digital photographing apparatus 1 in a general direction to perform a photographing operation, the user may perform a photographing operation using the template. In other words, the image A is positioned in the composite area 300.

Referring to FIG. 11C, the display unit 113 is in a flipped state as shown in FIGS. 10A and 10B. A rotation amount of the imaging device 106 is equal to or over a reference value.

As described above, when the display unit 113 is flipped, a horizontal symmetry change needs to be performed on a captured image. Accordingly, images A and B of subjects A' and B' are positioned as represented by dashed lines.

However, if a change in orientation is not performed on the template, the composite area 300 is positioned as it is at a right upper side of the display unit 113. Accordingly, unlike FIG. 11B, there is a problem that the image A of the subject A' is not displayed in the composite area 300.

Referring to FIG. 11D, similarly, a horizontal symmetry change is additionally performed on a template (this is an additional change since a 180 degrees rotational change has been performed on the template before flipping the display unit 113). In other words, a change in orientation is performed on a captured image and the template so as to achieve a mirror effect. Accordingly, an orientation of the composite area 300 is changed from a right upper side to a right lower side on the display unit 113 shown in FIG. 11D. Then, the image A of the subject A' is displayed in the composite area 300.

As such, a change in orientation is performed on the template set by a user as well as the captured image according to a state of the display unit 113 and a rotation amount of the imaging device 106, and thus, the user may naturally perform a self-photography function.

FIGS. 12A and 12B are views showing the digital photographing apparatus) that performs an image reproducing operation, according to another embodiment.

Referring to FIGS. 12A and 12B, if subjects A' is photographed using a template, the photographed subjects A' is as shown in FIG. 12A. Then, if a user presses a shutter-release button of the digital photographing apparatus 1 to apply a photographing signal, an image is captured.

When the image is captured, the captured image is generated by composing an image that is captured by the imaging device 106 and on which a change in orientation is not performed with a template on which a 180 degrees rotational symmetry change is performed. In other words, unlike an image displayed on the display unit 113 that is in a flipped state, a captured image may be generated by composing an image on which a horizontal symmetry change is not performed with a template on which a 180 degrees rotational symmetry change is performed.

A captured image 401 is stored as shown in FIG. 12A. In other words, an image, which is in a normal state where the imaging device 106 is not rotated, is stored. Accordingly, in the captured image 401, a composite area 300 of the template is positioned at a right upper side, and an image A of the subject A' is positioned in the composite area 300.

If an image is captured, the digital photographing apparatus 1 displays a quick-view image on the display unit 113. As shown in FIG. 11C, when the image is reversed only vertically and the template is reversed only horizontally (a horizontal symmetry change is additionally performed on the image on which a 180 degrees rotational symmetry change has been performed, and consequently, a result as if a vertical symmetry change has been performed on the image is obtained) to be displayed on the display unit 113, an image reversed horizontally is displayed as a live-view image compared to an image to be actually captured. However, the quick-view image is an image that is provided for a user to verify that an image is actually captured. Accordingly, when an image is captured in a state where the display unit 113 is flipped, it is preferable that the quick-view image is displayed as shown in FIG. 12A.

Thus, as shown in FIG. 12B, the quick-view image is displayed after capturing the image, if a state of the display unit 113 and a rotation amount of the imaging device 106 are the same as those when the image is captured, an image of which orientation is reversed horizontally, compared to a live-view image, should be displayed. The quick-view image shown in FIG. 12B is an image on which a 180 degrees rotational symmetry change is performed based on a stored captured image.

As described above, when the display unit 113 is in a flipped state and a rotation amount of the imaging device 106 is equal to or over a reference value, a horizontal symmetry change should be performed on the live-view image and a 180 degrees rotational symmetry change should be performed on the template to display the live-view image and the template. Also, when the quick-view image is displayed after the image is captured, if the digital photographing apparatus 1 is in the same state as described above, the captured image on which a 180 degrees rotational symmetry change is performed should be displayed.

Figure 13:
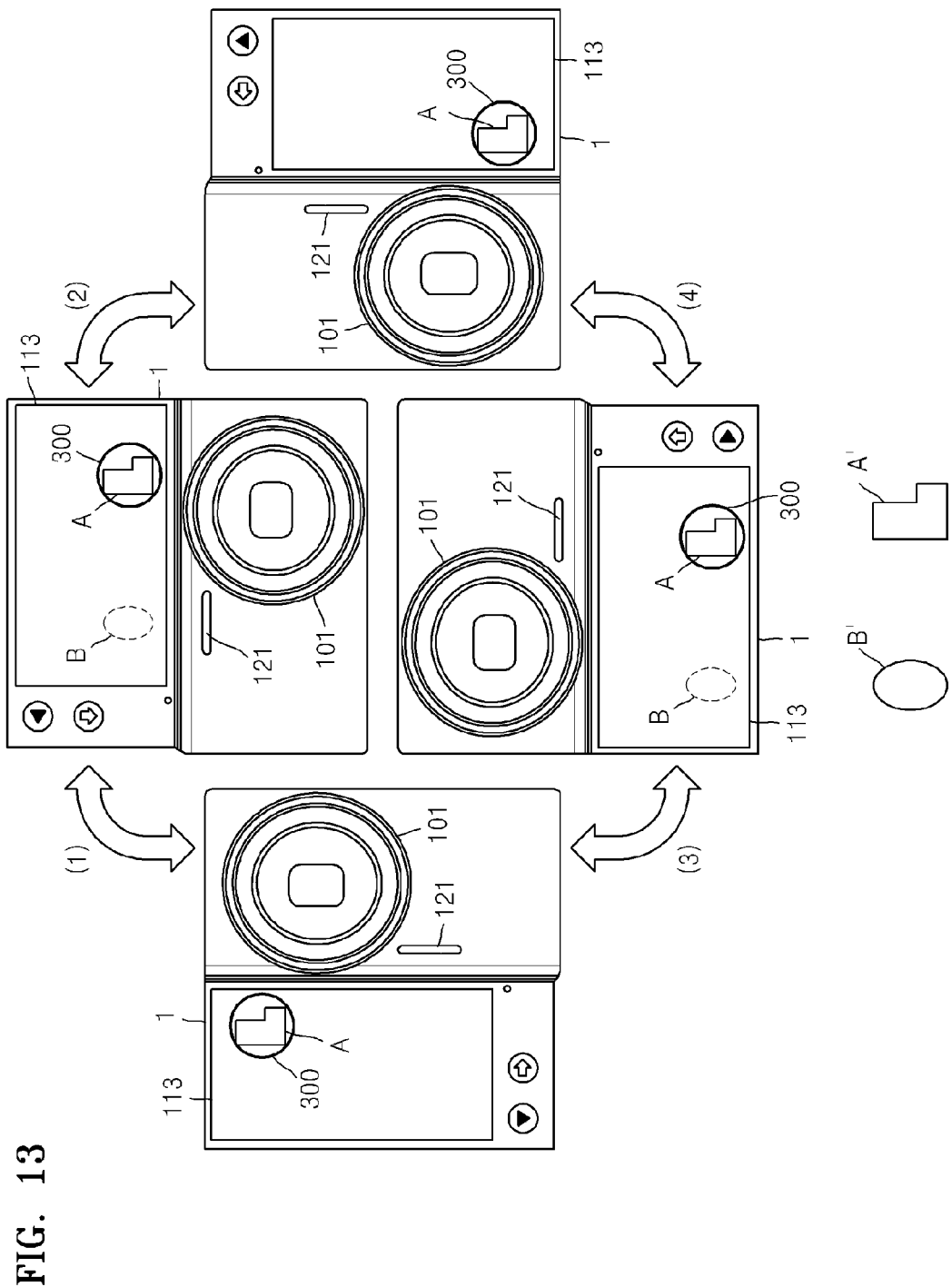
FIG. 13 is a view showing a digital photographing apparatus that performs a photographing operation, according to another embodiment.

FIG. 13 is a view showing the digital photographing apparatus 1 that performs a photographing operation, according to another embodiment.

FIG. 13 shows various cases where an image is rotated clockwise or counterclockwise in a state where the display unit 113 is flipped. When a rotation amount of the imaging device 106 is less than a reference value, an image A of a subject A' is positioned in the composite area 300.

In this state, if the digital photographing apparatus 1 is rotated clockwise (direction 1) or counterclockwise (direction 2), an orientation of an image of a subject is constant. In other words, the image A is displayed without changing its orientation. Also, even after a horizontal symmetry change is performed on the image due to flipping of the display unit 113, a template maintains its state. In this regard, when the rotation amount of the imaging device 106 is less than the reference value, the digital photographing apparatus 1 is rotated in the direction 1 or the direction 2.

When a rotation amount of the digital photographing apparatus 1 is increased and thus the digital photographing apparatus 1 is further rotated in a direction 3 or direction 4, the digital photographing apparatus 1 determines that the rotation amount of the imaging device 106 is equal to or over the reference value. Accordingly, a 180 degrees rotational symmetry change should be performed on the template based on when the rotation amount of the imaging device 106 is less than the reference value to display the template.

Figure 14:
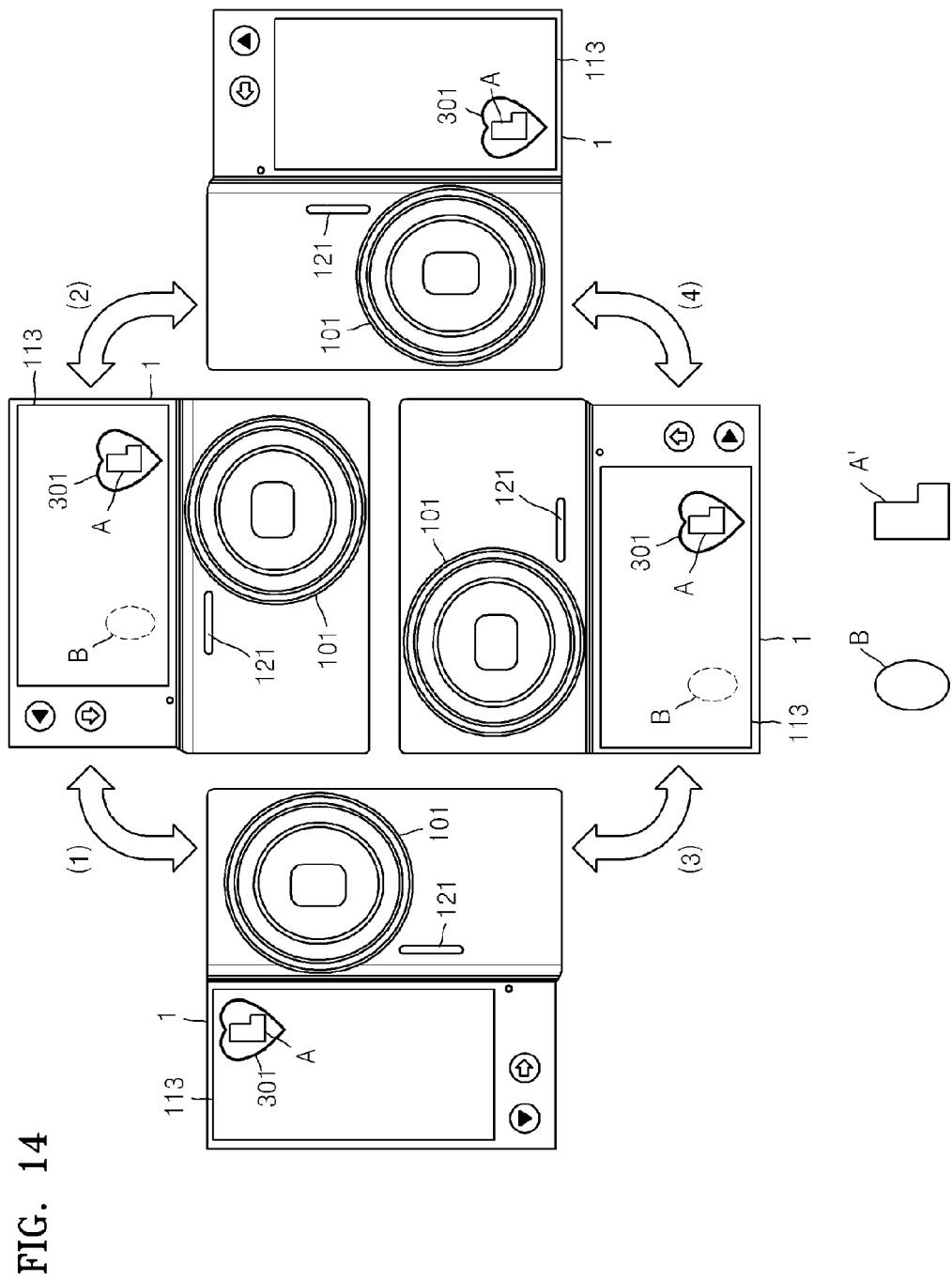
FIG. 14 is a view showing a digital photographing apparatus that performs a photographing operation, according to another embodiment.

FIG. 14 is a view showing the digital photographing apparatus 1 that performs a photographing operation according to another embodiment. In the current embodiment, a composite area 301 of a template has a directional property and is represented by a heart-shaped line. However, the invention is not limited thereto.

Referring to FIG. 14, similar to FIG. 13, a change in orientation is performed on a captured image and the template according to a rotation amount of the imaging device 106. However, it is preferable that the heart-shaped composite area 301 maintains its orientation that is set initially. Accordingly, when a change in orientation is performed on the template, a change in orientation is performed on the composite area 301 independently of a background area so as to maintain the initially set orientation of the composite area 301. A change in orientation is performed on the background area in the same manner as previous embodiments.

As described above and shown in FIGS. 13 and 14, when the display unit 113 is in a flipped state, a change in orientation is properly performed on the captured image and the template according to the rotation amount of the imaging device 106 and directional properties of the composite areas 300 and 301 to display the captured image and the template.

Figure 15A:
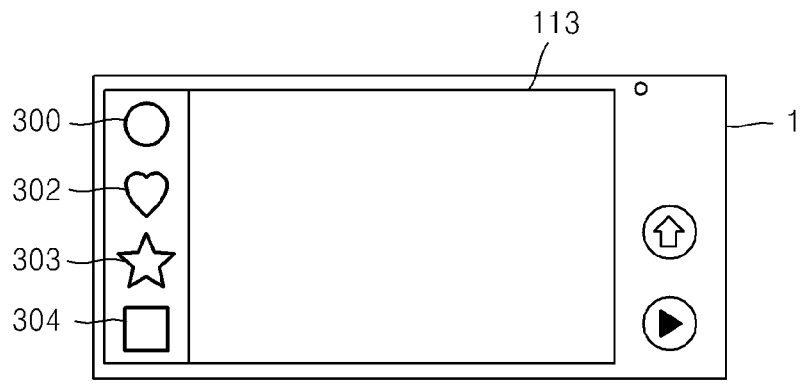
FIGS. 15A to 15C are a view for describing a method of setting a template, according to an embodiment.
Figure 15B:
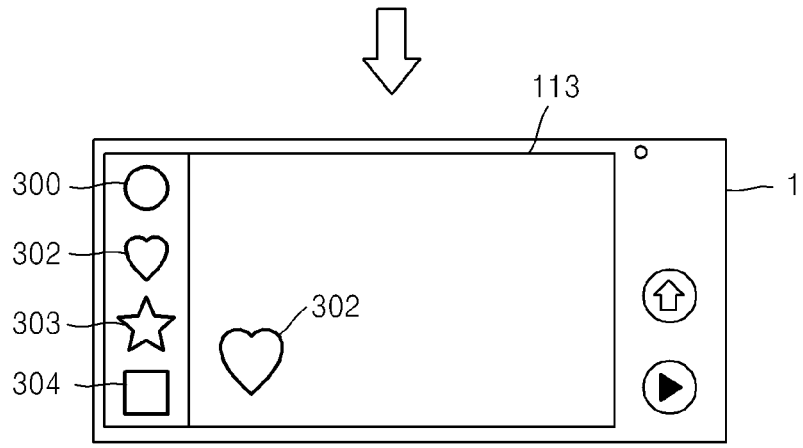
Figure 15C:
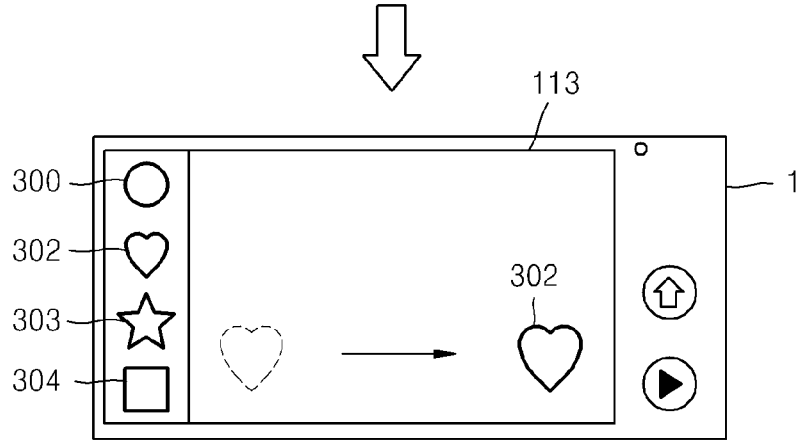

FIGS. 15A to 15C are a view for describing a method of setting a template according to an embodiment. FIGS. 15A to 15C show a method of setting a template in which a shape, a position, and a size of a composite area may be separately determined.

Referring to an image of FIG. 15A, a window for setting a template is displayed to a user. The storage unit 116 may store composite areas 300 to 304 having various shapes, and the stored composite areas 300 to 304 are displayed on the display unit 113.

Referring to an image of FIG. 15B, the user selects his or her desired composite area 302, and the selected composite area 302 is displayed in an initial position of the display unit 113. However, the invention is not limited thereto, and thus the user may touch a certain position or manipulate the manipulation unit 124 to select a position where the composite area 302 is to be initially displayed.

Referring to an image of FIG. 15C, the user may move the composite area 302 positioned in a certain position to another position by performing a dragging operation on the display unit 113 or by manipulating the manipulation unit 124.

A position or a shape of the composite area 302 may be set in the template by the above-described method.

Also, although not shown in FIGS. 15A to 15C, a size of the composite area 302 displayed on the display unit 113 according to a user's selection may vary by a user's manipulation.

In the current embodiment, although a method of setting a shape and a position of the composite area 302 as desired by a user has been described, the invention is not limited thereto. For example a user may be able to select a template in which a position or a shape of the composite area 302 may not be modified and to use the selected template as it is.

FIGS. 16A to 21 are flowcharts showing a method of controlling the digital photographing apparatus 1, according to an embodiment.

Figure 16A:
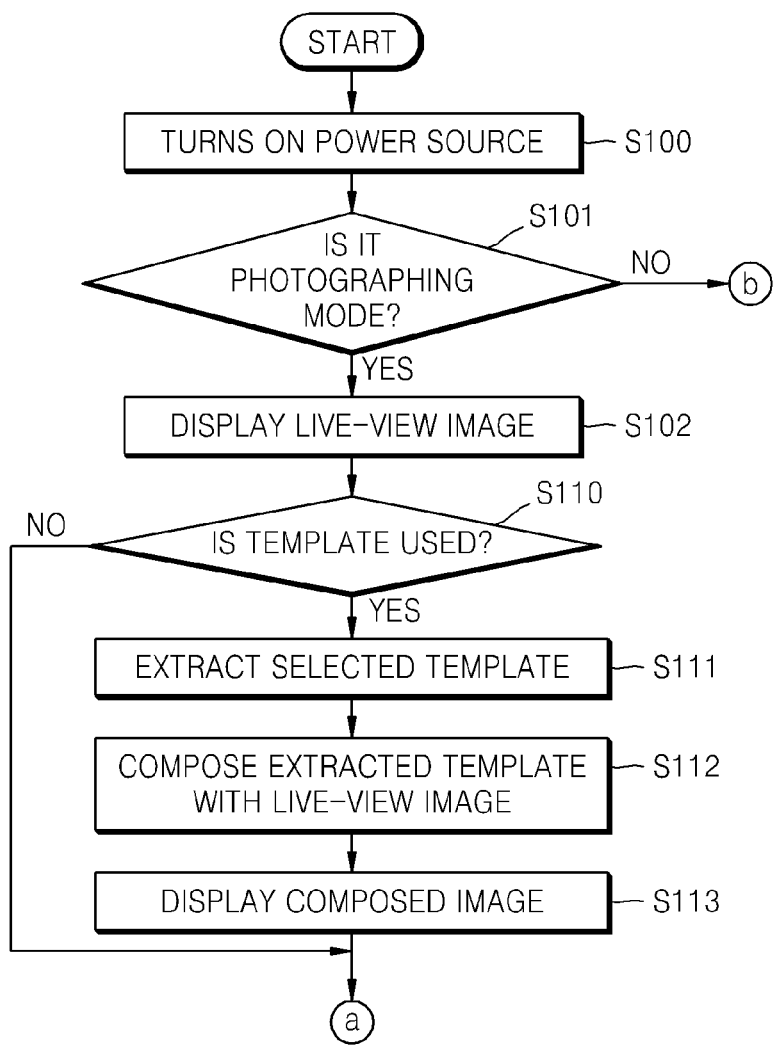
FIGS. 16A to 21 are flowcharts showing a method of controlling a digital photographing apparatus, according to an embodiment.
Figure 16B:
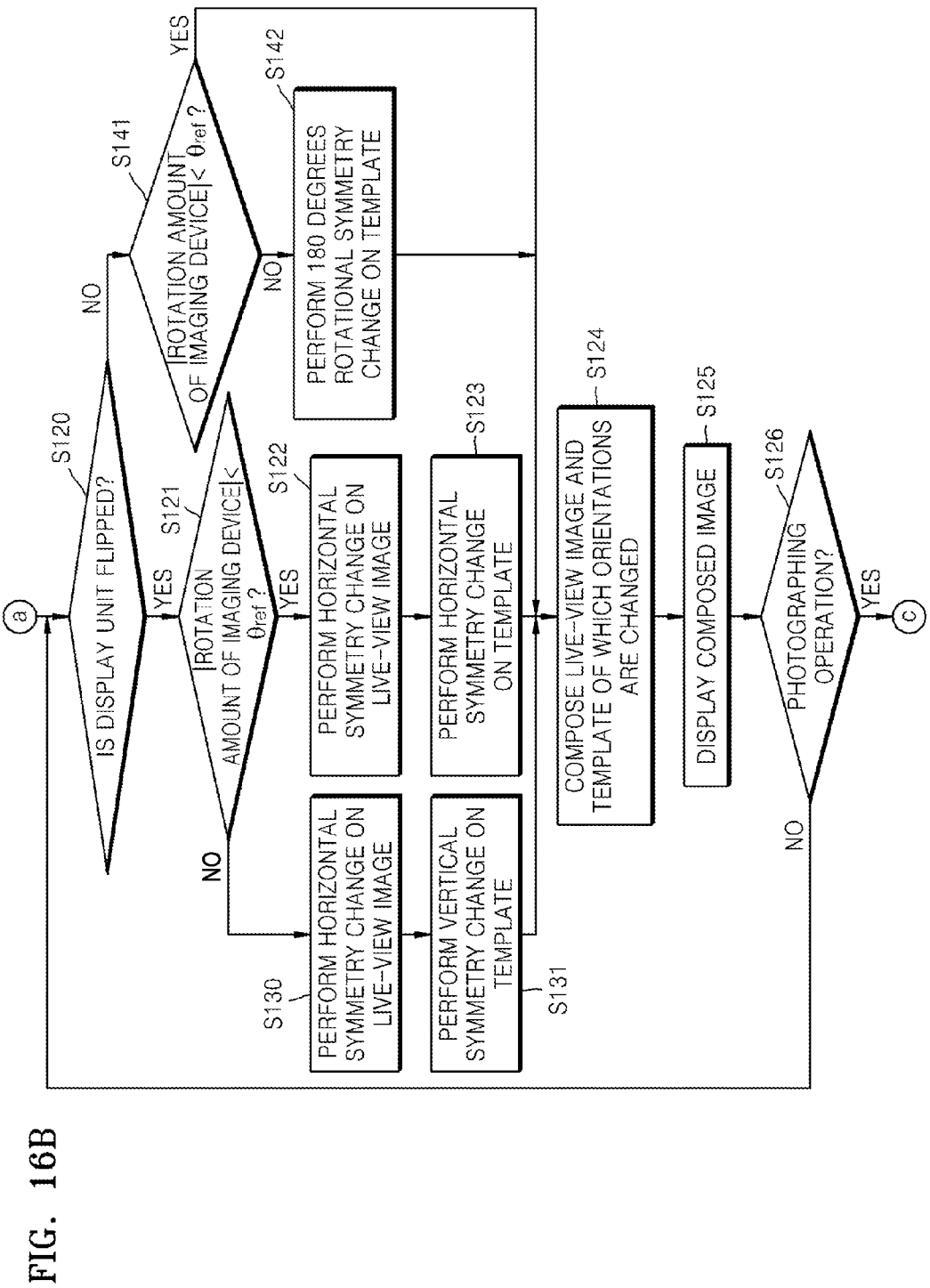

Referring to FIGS. 16A and 16B, a user turns on a power source to operate the digital photographing apparatus 1 (S100). Then, it is determined whether a mode of the digital photographing apparatus 1 is a photographing mode or a reproducing mode (S101). If the mode of the digital photographing apparatus 1 is a reproducing mode, the method is described with reference to FIG. 21. Otherwise, if the mode of the digital photographing apparatus 1 is a photographing mode, the digital photographing apparatus 1 periodically captures an image to generate a live-view image, and the captured image is displayed on the display unit 113 (S102). Then, it is determined whether a template is used during a photographing operation (S110).

If the template is used during a photographing operation, the template selected by the user is extracted from the storage unit 116 (S111), and the image composing unit 202 composes the extracted template with the live-view image (S112). Then, the composed image is displayed on the display unit 113 (S113). Otherwise, if the template is not used during a photographing operation, the method proceeds to S120 as shown in FIG. 16B.

Next, as shown in FIG. 16B, the CPU 104 determines whether the display unit 113 is in a flipped state (S120). If the CPU 104 determines that the display unit 113 is not in a flipped state, the CPU 104 determines whether a rotation amount of the imaging device 106 is less than a reference value θref (S141). In this regard, since the imaging device 106 may be rotated clockwise or counterclockwise, an absolute value is used to determine the rotation amount of the imaging device 106 regardless of a direction of rotation of the imaging device 106.

If the CPU 104 determines that the rotation amount of the imaging device 106 is less than the reference value θref, it is determined that the digital photographing apparatus 1 is used in a general state, and the method proceeds to S124. On the other hand, if the CPU 104 determines that the rotation amount of the imaging device 106 is equal to or over the reference value θref, the image changing unit 201 performs a 180 degrees rotational symmetry change on the template (S142).

Otherwise, if the CPU 104 determines that the display unit 113 is in a flipped state in S120, the CPU 104 determines whether the rotation amount of the imaging device 106 is less than the reference value θref (S121). If the CPU 104 determines that the rotation amount of the imaging device 106 is less than the reference value θref, it may be determined that a self-photography function is performed in a state where the display unit 113 is flipped upward. Accordingly, the image changing unit 201 performs a horizontal symmetry change on the live-view image (S122), and also performs a horizontal symmetry change on the template (S123). On the other hand, if the CPU 104 determines that the rotation amount of the imaging device 106 is equal to or over the reference value θref, it may be determined that a self-photography function is performed in a state where the display unit 113 is flipped downward. Accordingly, the image changing unit 201 performs a horizontal symmetry change on the live-view image (S130), and performs a vertical symmetry change on the template (S131).

Next, in S124, the image composing unit 202 composes the live-view image and the template of which orientations are changed (S124), and the display unit 113 displays the composed image (S125). Then, it is determined whether a photographing signal is applied, that is, a photographing operation is performed (S126). If the photographing signal is not applied, the method returns to S120. If the photographing signal is applied, the method proceeds to S200 as shown in FIG. 17.

By performing the above-described operation, an image composed with the template may be properly displayed according to a state of the display unit 113 and the rotation amount of the imaging device 106.

Figure 17:
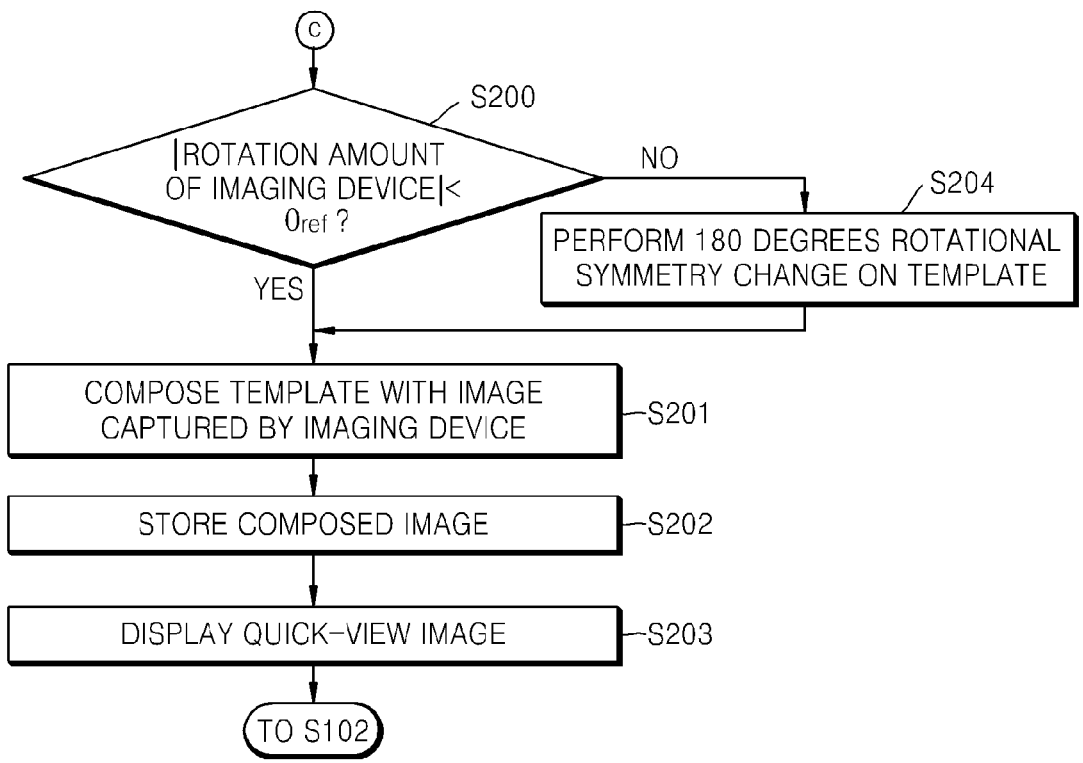

Next, referring to FIG. 17, when the photographing signal is applied, if the rotation amount of the imaging device 106 is less than the reference value θref during a photographing operation (S200), a change in orientation does not need to be performed on the template during generation of a captured image, and thus the method proceeds to S201. On the other hand, if the rotation amount of the imaging device 106 is equal to or over the reference value θref during a photographing operation, the digital photographing apparatus 1 is held upside down by a user, and thus the image changing unit 201 performs a 180 degrees rotational symmetry change on the template (S204).

Then, the image composing unit 202 composes the template of which orientation is or is not changed with an image captured by the imaging device 106 (S201). Then, the composed image is stored in the storage unit 116 (S202), and a quick-view image with regard to the stored image is generated and displayed on the display unit 113 (S203). If the photographing operation is finished through the above-described operation, the method returns to S102 to display the live-view image.

Hereinafter, a method of displaying a quick-view image (S203) will be described in detail.

Figure 18:
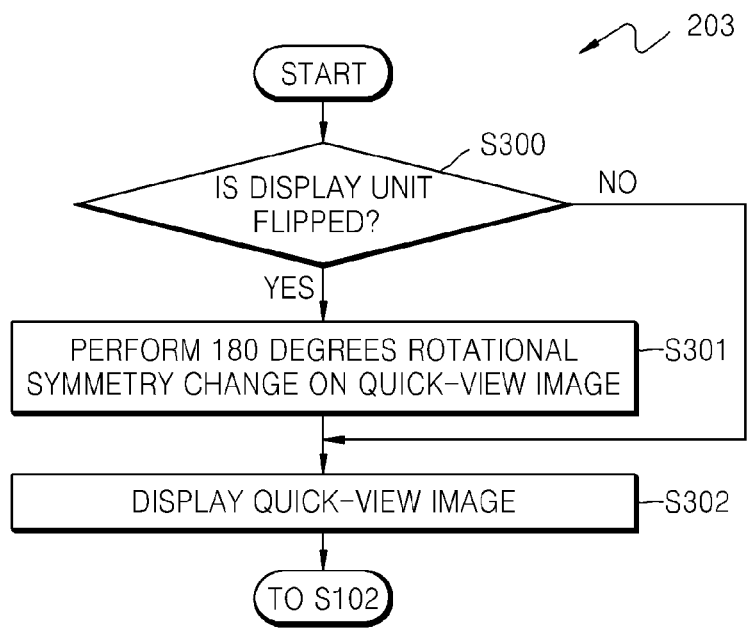

Referring to FIG. 18, the CPU 104 determines whether the display unit 113 is in a flipped state when displaying the quick-view image (S300). If the CPU 104 determines that the display unit 113 is in a flipped state, a 180 degrees rotational symmetry change is performed on the quick-view image with respect to a captured image or a stored image (S301). On the other hand, if the CPU 104 determines that the display unit 113 is not in a flipped state, a change in orientation is not performed on the quick-view image.

Then, the quick-view image of which orientation is or is not changed is displayed on the display unit 113 (S302).

Accordingly, the quick-view image may be properly displayed according to a state of the display unit 113 and a rotation amount of the imaging device 106.

Next, a method of setting a template will be described.

Figure 19:
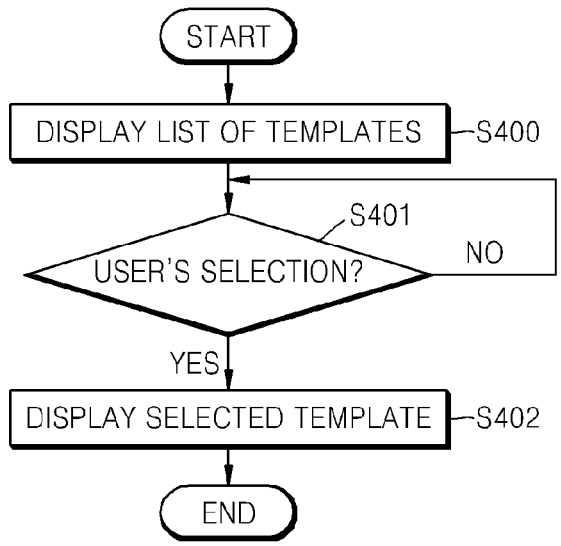

FIG. 19 is a flowchart showing a case where a user may not change a composite area of a template. Referring to FIG. 19, if the user determines to use the template and thus performs a proper manipulation, the digital photographing apparatus 1 may display a list of templates stored in the storage unit 116 (S400).

The user may select any one of the displayed templates (S401), and display the selected template on the display unit 113 (S402).

Figure 20:
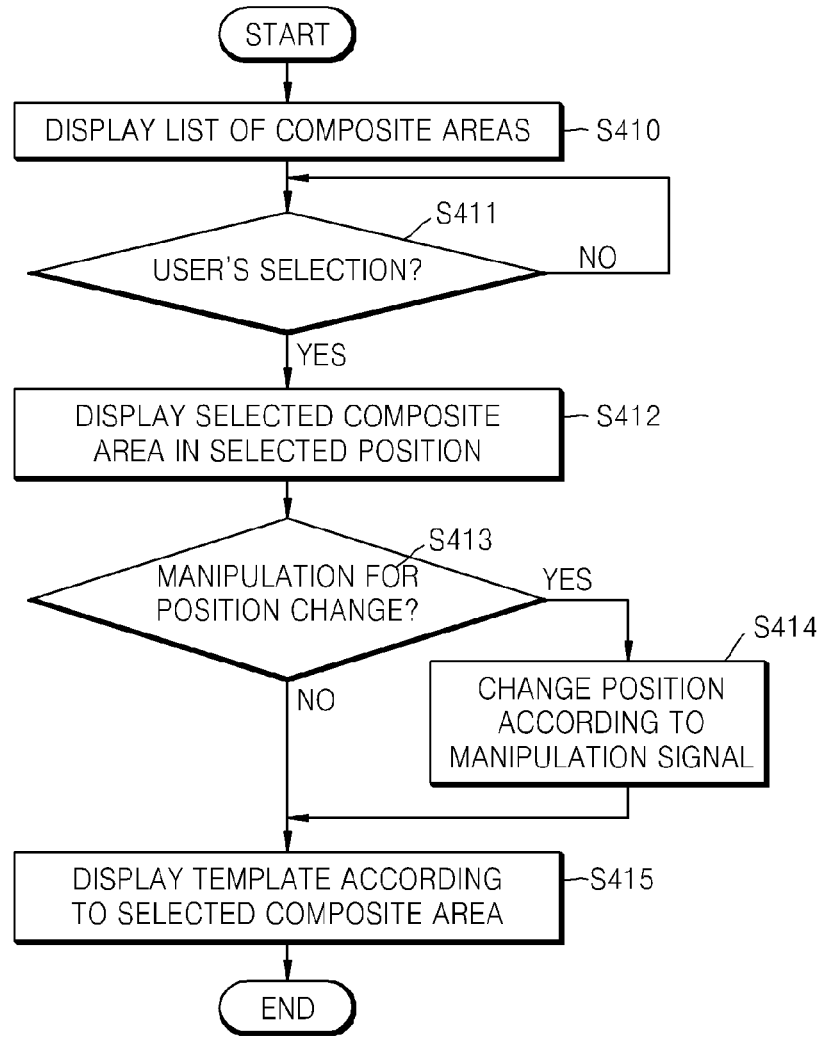

FIG. 20 is a flowchart showing a case where a user may change a composite area of a template. Referring to FIG. 20, if the user determines to use the template and thus performs a proper manipulation, the digital photographing apparatus 1 may display a list of composite areas stored in the storage unit 116 (S410).

The user may select any one of the displayed composite areas (S411), and display the selected composite area in a position selected by the user (S412).

Then, it is determined whether an operation for changing a position of the selected composite area is performed (S413). If the operation for changing the position of the selected composite area is performed, the position of the selected composite area is changed (S414).

If the position of the composite area is finally determined, a template according to the selected composite area is displayed on the display unit 113 (S415).

Figure 21:
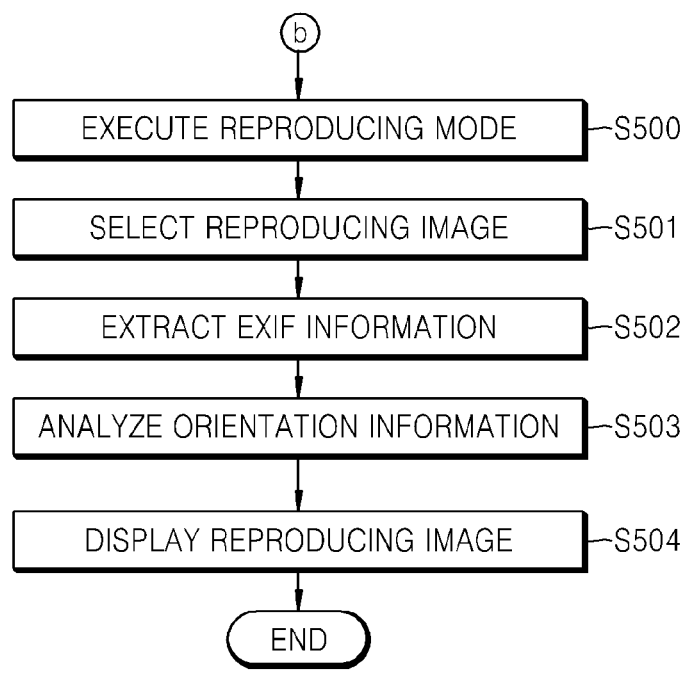

Next, a reproducing mode of the digital photographing apparatus 1 will be described with reference to FIG. 21.

If it is determined that a mode of the digital photographing apparatus 1 is a reproducing mode in S101, the digital photographing apparatus 1 executes the reproducing mode (S500), and selects a reproducing image from among stored images (S501).

If the reproducing image is selected, exchangeable image file format (EXIF) information of the selected reproducing image is extracted (S502), and then orientation information from among the extracted EXIF information is analyzed (S503).

Then, an orientation of the reproducing image is changed according to the orientation information, and then the reproducing image is displayed on the display unit 113 (S504). For example, if the orientation information includes information indicating that the selected reproducing image is captured when a user holds the digital photographing apparatus upside down, a 180 degrees rotational symmetry change may be performed on the stored image to reproduce the reproducing image.

As described above, the digital photographing apparatus 1 according to the embodiments may enable a user to naturally perform a self-photography function by properly changing orientations of a captured image, a template, a composite area, etc. according to a state of the display unit 113 and a rotation amount of the imaging device 106.

The particular embodiments shown and described herein are illustrative examples of the invention and are not intended to otherwise limit the scope of the invention in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical connections between the various elements. It should be noted that many alternative or additional functional relationships, physical connections or logical connections may be present in a practical device. Moreover, no item or component is essential to the practice of the invention unless the element is specifically described as "essential" or "critical". The words "mechanism", "element", "unit", "structure", "means", and "construction" are used broadly and are not limited to mechanical or physical embodiments, but may include software routines in conjunction with processors, etc. It will also be recognized that the terms "comprises," "comprising," "includes," "including," "has," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The invention is not limited to the described order of the steps. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

All references, including publications, patent applications, and patents, cited herein are hereby incorporated by reference to the same extent as if each reference were individually and specifically indicated to be incorporated by reference and were set forth in its entirety herein.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

What is claimed is:

1. A digital photographing apparatus comprising:
   an imaging device that generates an image signal by capturing image light;
   a storage unit that stores a template comprising a background area and a composite area that shows at least a part of an image according to the image signal;
   an image changing unit that extracts a selected template from the storage unit and changes orientations of the selected template and the image;
   an image composing unit that composes the image and the template of which orientations are changed; and
   a display unit that displays the composed image,
   wherein the image changing unit determines orientations to be changed of the selected template and the image according to a rotation amount of the imaging device with respect to an optical axis of the image light and an orientation in which an imaging surface of the imaging device faces.

2. The digital photographing apparatus of claim 1, wherein when the orientation in which the imaging surface faces is the same as an orientation in which the display unit faces, the image changing unit performs a horizontal symmetry change on the template and the image.

3. The digital photographing apparatus of claim 2, wherein the image composing unit generates a photographing image obtained by composing the image and the template on which changes in orientation are not performed according to a photographing signal, and when the photographing image is reproduced at a later time in a state where the rotation amount of the imaging device and the orientation of the display unit are the same as those during a photographing operation, a 180 degrees rotational symmetry change is performed on the photographing image with respect to a center of the photographing image to display the photographing image on the display unit.

4. The digital photographing apparatus of claim 1, wherein when the orientation in which the imaging surface faces is the same as the orientation in which the display unit faces and when the rotation amount of the imaging device is equal to or over a reference value, a horizontal symmetry change is performed on the image and a vertical symmetry change is performed on the template.

5. The digital photographing apparatus of claim 4, wherein the image composing unit generates a photographing image obtained by composing the image on which a change in orientation is not performed with a template on which a 180 degrees rotational symmetry change is performed according to a photographing signal, and when the photographing image is reproduced at a later time in a state where the rotation amount of the imaging device and the orientation of the display unit are the same as those during a photographing operation, a 180 degrees rotational symmetry change is performed on the photographing image with respect to a center of the photographing image to display the photographing image on the display unit.

6. The digital photographing apparatus of claim 1, wherein an upper surface of the display unit is supported by the digital photographing apparatus to rotate.

7. The digital photographing apparatus of claim 6, wherein the display unit rotates between an orientation in which an imaging surface of the imaging device faces and an opposite orientation thereof.

8. The digital photographing apparatus of claim 7, further comprising a position sensor that determines whether the display unit rotates at an angle equal to or over a reference angle.

9. The digital photographing apparatus of claim 1, further comprising a movement sensor that senses a rotation amount of the imaging device with respect to the optical axis.

10. The digital photographing apparatus of claim 1, further comprising a template determination unit that determines whether the composite area of the template has a directional property.

11. The digital photographing apparatus of claim 10, wherein when the composite area has a directional property, the image changing unit separately performs changes in orientation on the composite area and the background area.

12. The digital photographing apparatus of claim 11, wherein when the composite area has a directional property, the image changing unit performs a change in orientation so that the orientation of the composite area is the same as an orientation of the image.

13. The digital photographing apparatus of claim 1, further comprising a composite area setting unit that sets a position of the composite area of the template.

14. The digital photographing apparatus of claim 1, further comprising:
a memory that stores the image signal; and
a memory controller that controls the storage of the image signal,
wherein the memory controller changes an order of addresses storing the image signal in the memory according to the rotation amount of the imaging device with respect to the optical axis of the image light and an orientation in which the display unit faces with respect to the orientation in which the imaging surface of the imaging device faces.

15. The digital photographing apparatus of claim 14, wherein the memory controller stores the image signal in the memory by using a direct memory access (DMA) method.

16. A method of controlling a digital photographing apparatus, the method comprising:
generating an image signal by capturing image light;
selecting a template comprising a background area and a composite area that indicates at least a part of an image according to the image signal;
changing orientations of the selected template and the image according to a movement of the digital photographing apparatus;
composing the image and the template of which orientations are changed; and
displaying the composed image.

17. The method of claim 16, wherein the movement of the digital photographing apparatus comprises a rotation amount of an imaging device with respect to an optical axis of the image light and an orientation in which a display unit faces with respect to an orientation in which an imaging surface faces.

18. The method of claim 17, wherein when the orientation in which the imaging surface faces is opposite to the orientation in which the display unit faces, a horizontal symmetry change is performed on the template and the image.

19. The method of claim 17, wherein when the orientation in which the imaging surface faces is opposite to the orientation in which the display unit faces and when the rotation amount of the imaging device is equal to or over a reference value, a horizontal symmetry change is performed on the image and a vertical symmetry change is performed on the template.

20. The method of claim 17, further comprising:
generating a photographing image obtained by composing the image and the template on which changes in orientation are not performed according to a photographing signal; and
when the photographing image is reproduced at a later time in a state where the rotation amount of the imaging device and the orientation of the display unit are the same as those during a photographing operation, performing a 180 degrees rotational symmetry change on the photographing image with respect to a center of the photographing image to display the photographing image on the display unit.

* * * * *